United States Patent
Suzuki et al.

(10) Patent No.: US 11,391,582 B2
(45) Date of Patent: *Jul. 19, 2022

(54) INFORMATION PROVIDING DEVICE AND INFORMATION PROVIDING METHOD AND NON-TRANSITORY COMPUTER READABLE MEDIUM THEREFOR

(71) Applicant: TOYOTA JIDOSHA KABUSHIKI KAISHA, Toyota (JP)

(72) Inventors: Keiko Suzuki, Tokyo (JP); Ko Koga, Tokyo (JP); Takuji Yamada, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 232 days.

This patent is subject to a terminal disclaimer.

(21) Appl. No.: 16/782,738

(22) Filed: Feb. 5, 2020

(65) Prior Publication Data

US 2020/0173792 A1 Jun. 4, 2020

Related U.S. Application Data

(63) Continuation of application No. 15/987,357, filed on May 23, 2018, now Pat. No. 10,591,307, which is a (Continued)

(30) Foreign Application Priority Data

Dec. 7, 2016 (JP) .............................. JP2016-238046

(51) Int. Cl.
*G01C 21/34* (2006.01)
*G06F 16/635* (2019.01)
(Continued)

(52) U.S. Cl.
CPC ....... *G01C 21/343* (2013.01); *G01C 21/3484* (2013.01); *G06F 16/635* (2019.01);
(Continued)

(58) Field of Classification Search
CPC .............. G01C 21/343; G01C 21/3484; G06Q 10/025; G06Q 10/047; G06F 16/635
See application file for complete search history.

(56) References Cited

U.S. PATENT DOCUMENTS 6,679,702 B1  1/2004 Rau
9,177,475 B2  11/2015 Sellschopp
(Continued)

FOREIGN PATENT DOCUMENTS

JP  2010073184 A  4/2010
JP  2013008331 A  1/2013

*Primary Examiner* — Mussa A Shaawat
(74) *Attorney, Agent, or Firm* — Hunton Andrews Kurth LLP

(57) ABSTRACT

An information providing device for a trip to multiple users including a first user and a second user is provided. The information providing device includes circuitry configured to determine a destination of the trip based on a degree of interest of the first user, provide the second user with a first trip proposal to the destination when a degree of interest of the second user in the destination is greater than or equal to a predetermined degree-of-interest threshold value, and provide the second user with a second trip proposal to the destination when the degree of interest of the second user in the destination is less than the predetermined degree-of-interest threshold value. In the second trip proposal, a degree of recommendation of the trip proposal is increased from the first trip proposal.

20 Claims, 18 Drawing Sheets

Related U.S. Application Data continuation of application No. 15/832,178, filed on Dec. 5, 2017, now Pat. No. 10,006,775.

(51) Int. Cl.
*G06Q 10/02* (2012.01)
*G06Q 10/04* (2012.01)
*G06Q 10/10* (2012.01)
*G06Q 50/00* (2012.01)
*G06Q 50/14* (2012.01)

(52) U.S. Cl.
CPC ........... *G06Q 10/02* (2013.01); *G06Q 10/025* (2013.01); *G06Q 10/04* (2013.01); *G06Q 10/047* (2013.01); *G06Q 10/10* (2013.01); *G06Q 50/01* (2013.01); *G06Q 50/14* (2013.01)

(56) References Cited

U.S. PATENT DOCUMENTS

| | | | |
|---|---|---|---|
| 9,710,873 B1* | 7/2017 | Hill | G06T 11/00 |
| 2011/0153532 A1 | 6/2011 | Kuge et al. | |
| 2011/0191017 A1* | 8/2011 | Certin | G01C 21/343 |
| | | | 701/532 |
| 2012/0253823 A1 | 10/2012 | Schalk et al. | |
| 2014/0128144 A1 | 5/2014 | Bavitz et al. | |
| 2014/0365313 A1 | 12/2014 | Reese et al. | |
| 2015/0106285 A1 | 4/2015 | Chu et al. | |
| 2015/0168150 A1* | 6/2015 | Kahn | G01C 21/00 |
| | | | 701/408 |
| 2015/0330800 A1* | 11/2015 | Huyi | G01C 21/343 |
| | | | 701/425 |
| 2016/0125502 A1 | 5/2016 | Byron et al. | |
| 2016/0202076 A1* | 7/2016 | Feng | G01C 21/343 |
| | | | 701/408 |
| 2017/0161651 A1 | 6/2017 | Demarchi et al. | |
| 2017/0217424 A1 | 8/2017 | Park | |
| 2018/0040020 A1 | 2/2018 | Goswami et al. | |

* cited by examiner

Fig.3

| User ID Combination | | Friend Registration on SNS | Message Frequency on SNS | Degree of Affinity |
|---|---|---|---|---|
| 1st User ID | 2nd User ID | | | |
| ID1 | ID2 | ○ | High | High |
| | ID3 | × | – | Low |
| | ⋮ | ⋮ | ⋮ | ⋮ |
| ID2 | ID3 | ○ | Low | Moderate |
| | ID4 | ○ | High | High |
| | ⋮ | ⋮ | ⋮ | ⋮ |
| ⋮ | ⋮ | ⋮ | ⋮ | ⋮ |

Fig.4

| User ID | Facility Name | Keyword Appearance Frequency on SNS | Viewing Frequency of TV, magazines, and websites | Degree of Interest |
|---|---|---|---|---|
| ID1 | Facility A | High | High | High |
| | Facility B | High | Low | Moderate |
| | ⋮ | ⋮ | ⋮ | ⋮ |
| ID2 | Facility A | Low | High | Moderate |
| | Facility B | Low | Low | Low |
| | ⋮ | ⋮ | ⋮ | ⋮ |
| ⋮ | ⋮ | ⋮ | ⋮ | ⋮ |

Fig.5

| Traveling Means $X_1$ | Purpose $X_2$ | Weather $X_3$ | Temperature $X_4$ | Road Environment (For Cars) $X_5$ | Pattern of Use $X_6$ | Frequent Level $X_7$ | Usage Time $X_8$ | Waiting Time (Traffic Congestion Time) $X_9$ | Calorie Consumption (Kcal) $X_{10}$ |
|---|---|---|---|---|---|---|---|---|---|
| Walking | Sightseeing | Sunny | Scorching | Lighted Road | Stand in Crowd | 0 | 5 | 5 | 10 |
| Bicycle | Business | Rain | Hot | Dark Road | Stand | 10 | 10 | 10 | 30 |
| Taxi | Club | Windy | Moderate | Narrow Road | Sit | 20 | 15 | 15 | 50 |
| Car | | Violent Winds | Cold | Wide Road | Walk Quickly | 30 | 20 | 20 | 75 |
| Train | | Torrent | Frigid | Mountain Road | Run | 40 | 30 | 30 | 100 |
| Bus | | Rainstorm | | | Drive Alone | 50 | 60 | 60 | 200 |
| Airplane | | | | | Drive with Family | 60 | 120 | 120 | 400 |
| Car Sharing | | | | | Drive with Friend | 70 | 180 | 180 | 600 |
| Car Rental | | | | | Family in Passenger Seat | 80 | 240 | 240 | 1000 |
| i-Road | | | | | Friend in Passenger Seat | 90 | 360 | 360 | 1500 |
| Shinkansen (Limited Express Train) | | | | | | 100 | 480 | 480 | 2000 |

Fig.6

| | State | Traveling Means $X_1$ | Purpose $X_2$ | Weather $X_3$ | Temperature $X_4$ | Road Environment $X_5$ | Pattern of Use $X_6$ | Frequent Level $X_7$ | Usage Time $X_8$ | Waiting Time $X_9$ | Calorie Consumption (kcal) $X_{10}$ | Burden $Y$ | Note |
|---|---|---|---|---|---|---|---|---|---|---|---|---|---|
| Commuting 1 | S1 | Walking | Commuting | Sunny | Hot | — | Walk Quickly | 100 | 15 | 5 | 70 | 5 | Home to Station A |
| | S2 | Train | Commuting | Sunny | Moderate | — | Stand | 100 | 15 | 5 | 80 | 3 | Station A to Station B |
| | S3 | Train | Commuting | Sunny | Moderate | — | Sit | 100 | 20 | 0 | 50 | 4 | Station B to Station C |
| | S4 | Walking | Commuting | Sunny | Hot | — | Walk Quickly | 100 | 10 | 0 | 70 | 3 | Station C to Workplace |
| Shopping 1 | S5 | Walking | Shopping | Sunny | Hot | — | Walk Quickly | 100 | 15 | 5 | 70 | 6 | Home to Station A |
| | S6 | Train | Shopping | Rain | Moderate | — | Stand | 100 | 6 | 5 | 30 | 5 | Station A to Station D |
| Travel 1 | S7 | Walking | Travel | Sunny | Hot | — | Walk Quickly | 100 | 15 | 0 | 70 | 7 | Home to Station A |
| | S8 | Train | Travel | Sunny | Moderate | — | Stand in Crowd | 30 | 21 | 5 | 80 | 5 | Station A to Station E |
| | S9 | Train | Travel | Sunny | Moderate | — | Stand in Crowd | 0 | 15 | 5 | 50 | 3 | Station E to Station F |
| | S10 | Limited Express Train | Travel | Sunny | Moderate | — | Sit | 0 | 65 | 6 | 150 | 4 | Station F to Station G |
| | S11 | Bus | Travel | Sunny | Moderate | — | Sit | 0 | 30 | 30 | 160 | 5 | Station G to Facility A |
| | ... | ... | ... | ... | ... | ... | ... | ... | ... | ... | ... | ... | ... |

| User ID | State | Burden |
|---|---|---|
| ID1 | S1 | 5 |
| | S2 | 3 |
| | S3 | 4 |
| | ⋮ | ⋮ |
| ID2 | S1 | 4 |
| | S2 | 3 |
| | S3 | 3 |
| | ⋮ | ⋮ |
| ID3 | S1 | 6 |
| | S2 | 5 |
| | S3 | 5 |
| | ⋮ | ⋮ |
| ⋮ | ⋮ | ⋮ |

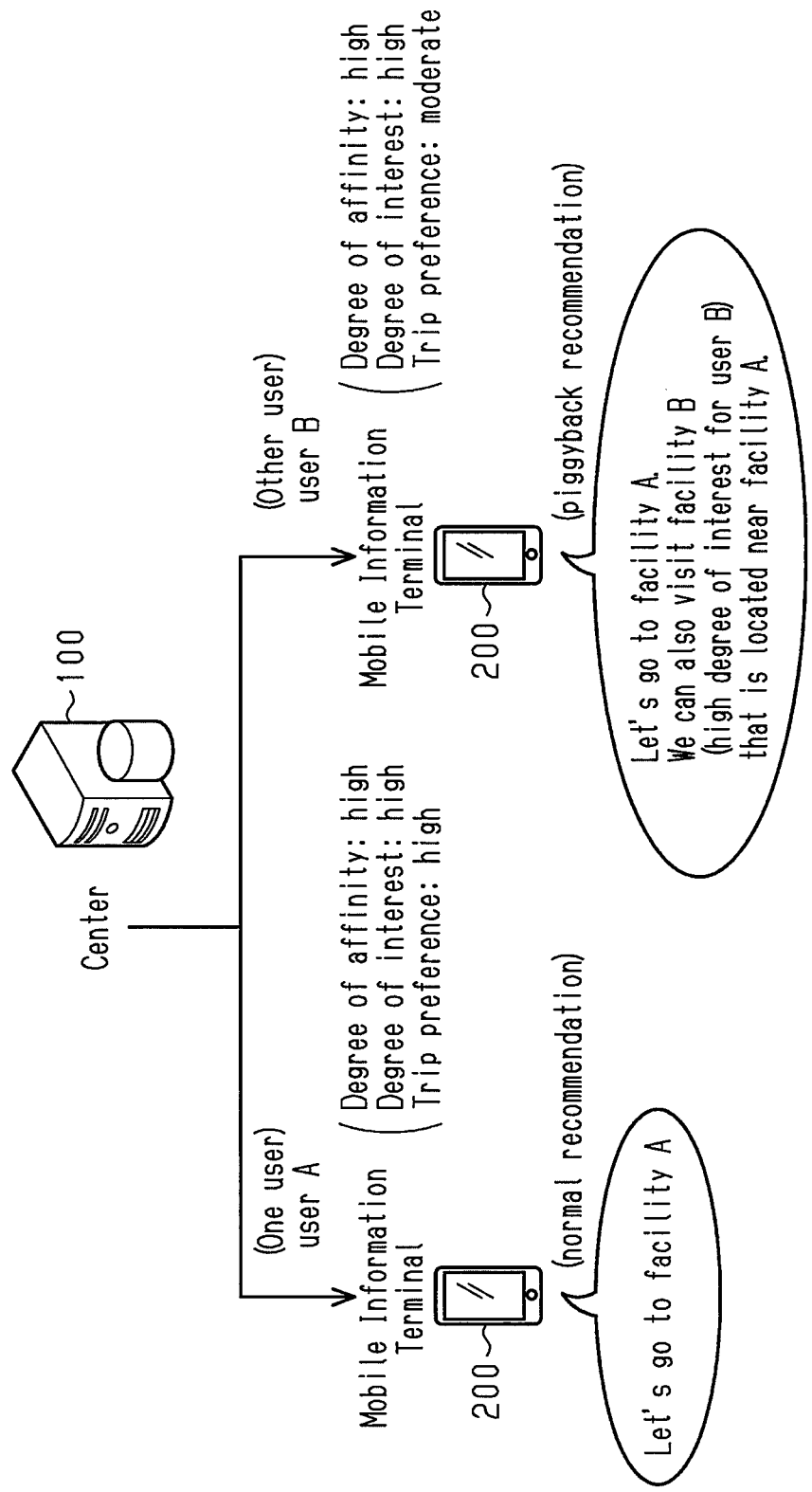

Fig.13

| No | Degree of Affinity Between Two Persons | User A (One User) | | User B (Other User) | | Proposal Content | Proposal Order |
|---|---|---|---|---|---|---|---|
| | | Degree of Interest | Trip Preference | Degree of Interest | Trip Preference | | |
| 1 | High | High | High | High | High | A normal / B normal | When appropriate |
| 2 | High | High | Moderate | High | Moderate | A piggyback / B piggyback | When appropriate |
| 3 | High | High | Moderate | Moderate | High | A piggyback / B high + piggyback | User A → User B |
| 4 | High | High | Low | Moderate | High | A piggyback / B high + piggyback | User A → User B |
| 5 | High | High | Moderate | High | Moderate | A normal / B piggyback | When appropriate |
| 6 | High | High | High | High | Moderate | A piggyback / B piggyback | User B → User A |
| 7 | High | High | Moderate | Low | High | A piggyback / B piggyback + high | User A → User B |
| 8 | Moderate | High | High | High | High | A piggyback / B piggyback | When appropriate |
| 9 | Moderate | High | Moderate | High | Moderate | A piggyback / B piggyback | When appropriate |
| ... | ... | ... | ... | ... | ... | ... | ... |

Fig.18

| No | Degree of Affinity Between Two Persons | User A (One User) | | | | User B (Other User) | | | | Proposal Content | Proposal Order |
|---|---|---|---|---|---|---|---|---|---|---|---|
| | | Degree of Interest | Trip Preference | Physical Ability | Car Possession | Degree of Interest | Trip Preference | Physical Ability | Car Possession | | |
| 1 | High | High | High | ○ | ○ | High | High | △ | ○ | A normal<br>B affectionate | User A → User B |
| 2 | High | High | Moderate | ○ | ○ | High | Moderate | ○ | × | A piggyback<br>B piggyback + affectionate | User A → User B |
| 3 | High | High | Moderate | ○ | × | Moderate | High | ○ | ○ | A piggyback + affectionate<br>B high + piggyback | User A → User B → User A |
| 4 | High | High | Low | ○ | ○ | Moderate | High | ○ | ○ | A piggyback<br>B high + piggyback | User A → User B |
| 5 | High | High | High | ○ | × | High | Moderate | ○ | × | A alternative means<br>B piggyback + alternative means | User B → User A |
| 6 | High | High | Moderate | ○ | ○ | Low | High | ○ | ○ | A piggyback<br>B piggyback + high | User A → User B |
| 7 | Moderate | High | High | △ | ○ | High | High | ○ | ○ | A piggyback + affectionate<br>B piggyback | User B → User A |
| 8 | Moderate | High | Moderate | ○ | ○ | High | Moderate | × | ○ | A piggyback<br>B piggyback + affectionate | User A → User B |
| ... | ... | ... | ... | ... | ... | ... | ... | ... | ... | ... | ... |

Fig.20

| No | Degree of Affinity Between Two Persons | User A (One User) | | User B (Other User) | | Relation of Two Persons | Proposal Content | Proposal Order |
|---|---|---|---|---|---|---|---|---|
| | | Degree of Interest | Trip Preference | Degree of Interest | Trip Preference | | | |
| 1 | High | High | High | High | High | A=B | A normal<br>B normal | When appropriate |
| 2 | High | High | Moderate | High | Moderate | A>B | A piggyback<br>B piggyback + message | User A → User B |
| 3 | High | High | Moderate | Moderate | High | A<B | A piggyback + message<br>B high + piggyback | User A → User B → User A |
| 4 | High | High | Moderate | Moderate | High | A<B | A piggyback + message<br>B high + piggyback | User A → User B → User A |
| 5 | High | High | Moderate | Moderate | Moderate | A<B | A piggyback + message<br>B high + piggyback | User A → User B → User A |
| 6 | High | High | High | High | Moderate | A>B | A normal<br>B piggyback + message | User A → User B |
| 7 | High | High | High | Low | High | A>B | A normal<br>B piggyback + message + high | User A → User B |
| 8 | Moderate | High | High | High | High | A>B | A piggyback<br>B piggyback + message | User A → User B |
| 9 | Moderate | High | Moderate | High | Moderate | A=B | A piggyback<br>B piggyback | When appropriate |
| ... | ... | ... | ... | ... | ... | ... | ... | ... |

INFORMATION PROVIDING DEVICE AND INFORMATION PROVIDING METHOD AND NON-TRANSITORY COMPUTER READABLE MEDIUM THEREFOR

CROSS-REFERENCE TO RELATED APPLICATION

This is a continuation application of U.S. patent application Ser. No. 15/987,357, filed May 23, 2018, which is continuation of U.S. patent application Ser. No. 15/832,178, filed Dec. 5, 2017 which claims priority to Japanese Patent Application No. 2016-238046 filed on Dec. 7, 2016, which are incorporated herein by reference in their entirety.

BACKGROUND ART

The present disclosure relates to an information providing device and an information providing method for a trip to a user. The present disclosure also relates to a non-transitory computer readable medium therefor.

Japanese Laid-Open Patent Publication No. 2010-73184 describes an example of an information providing device including a spot information database that stores, for example, information related to a stopover candidate spot such as location, type, allowed stopover time, rating, and fee of the stopover candidate spot. Further, such an information providing device has a route information database that stores, for example, information related to the means of transportation necessary for reaching the stopover candidate spot such as means of transportation that can be used to travel in a designated section, a timetable of the means of transportation, and a fee schedule. Further, when the user inputs the necessary information of the planned trip such as the planned stopover spot and planned stopover time, the information providing device refers to the spot information database and the route information database to generate an optimized recommended trip plan satisfying the input condition. This prompts the user to go on trips.

However, in order for the information providing device to generate a recommended trip plan, the user needs to input the necessary information related to the trip. In other words, the information providing device is designed under the assumption that a user is intending to take a trip to a planned stopover spot. For this reason, the information providing device cannot generate a recommended trip plan when the user has not set a planned stopover spot. Therefore, the information providing device is unable to prompt the user to go on a trip when the use has not set a planned stopover spot.

SUMMARY

It is an object of the present disclosure to provide an information providing device and an information providing method that prompts the user to go on a trip by proposing a trip including the setting of a destination to the user. Further, it is an object of the present disclosure to provide a non-transitory computer readable medium therefor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides an information providing device for a trip to multiple users including a first user and a second user, the information providing device including circuitry configured to determine a destination of the trip based on a degree of interest of the first user, provide the second user with a first trip proposal to the destination when a degree of interest of the second user in the destination is greater than or equal to a predetermined degree-of-interest threshold value, and provide the second user with a second trip proposal to the destination when the degree of interest of the second user in the destination is less than the predetermined degree-of-interest threshold value. In the second trip proposal, a degree of recommendation of the trip proposal is increased from the first trip proposal.

An aspect of the present disclosure provides an information providing method for a trip to multiple users including a first user and a second user, the method including determining a destination of the trip based on a degree of interest of the first user, providing the second user with a first trip proposal to the destination when a degree of interest of the second user in the destination is greater than or equal to a predetermined degree-of-interest threshold value, and providing the second user with a second trip proposal to the destination when the degree of interest of the second user in the destination is less than the predetermined degree-of-interest threshold value. In the second trip proposal, a degree of recommendation of the trip proposal is increased from the first trip proposal.

An aspect of the present disclosure provides a non-transitory computer readable medium that stores a program for a trip to multiple users including a first user and a second user. The program instructs an information providing device to determine a destination of the trip based on a degree of interest of the first user, provide the second user with a first trip proposal to the destination when a degree of interest of the second user in the destination is greater than or equal to a predetermined degree-of-interest threshold value, and provide the second user with a second trip proposal to the destination when the degree of interest of the second user in the destination is less than the predetermined degree-of-interest threshold value. In the second trip proposal, a degree of recommendation of the trip proposal is increased from the first trip proposal.

Other features and aspects will be apparent from the following detailed description, the drawings, and the claims.

BRIEF DESCRIPTION OF DRAWINGS

The invention, together with objects and advantages thereof, may best be understood by reference to the following description of the presently preferred embodiments together with the accompanying drawings in which:

FIG. 3 is a diagram illustrating an example of a data table used for estimation of a degree of affinity between users;

FIG. 4 is a diagram illustrating an example of a data table used for estimation of a degree of interest of a user with respect to a facility;

FIG. 5 is a diagram illustrating exemplary characteristic quantities that characterizing the burden on a user when the user travels;

FIG. 6 is a diagram illustrating an example of a corresponding relationship between states included in a travel route and burden of a user;

FIG. 12 is a diagram illustrating a further example of a trip proposal provided by the information providing device of FIG. 1;

FIG. 13 is a diagram illustrating an example of the corresponding relationship of degree of affinity of users, degree of interest, and trip preference, trip proposal content, and proposal order;

FIG. 18 is a diagram illustrating an example of a corresponding relationship of degree of affinity, degree of interest, trip preference, physical ability, ownership of a car, trip proposal content, and proposal order;

FIG. 20 is a diagram illustrating an example of a corresponding relationship of degree of affinity, degree of interest, trip preference, and relationship of users, trip proposal content, and proposal order.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION OF EMBODIMENTS

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

An information providing device according to a first embodiment will now be described.

First, the overview of the flow of a process for proposing a trip through the information providing device according to the first embodiment will be described.

Figure 1:
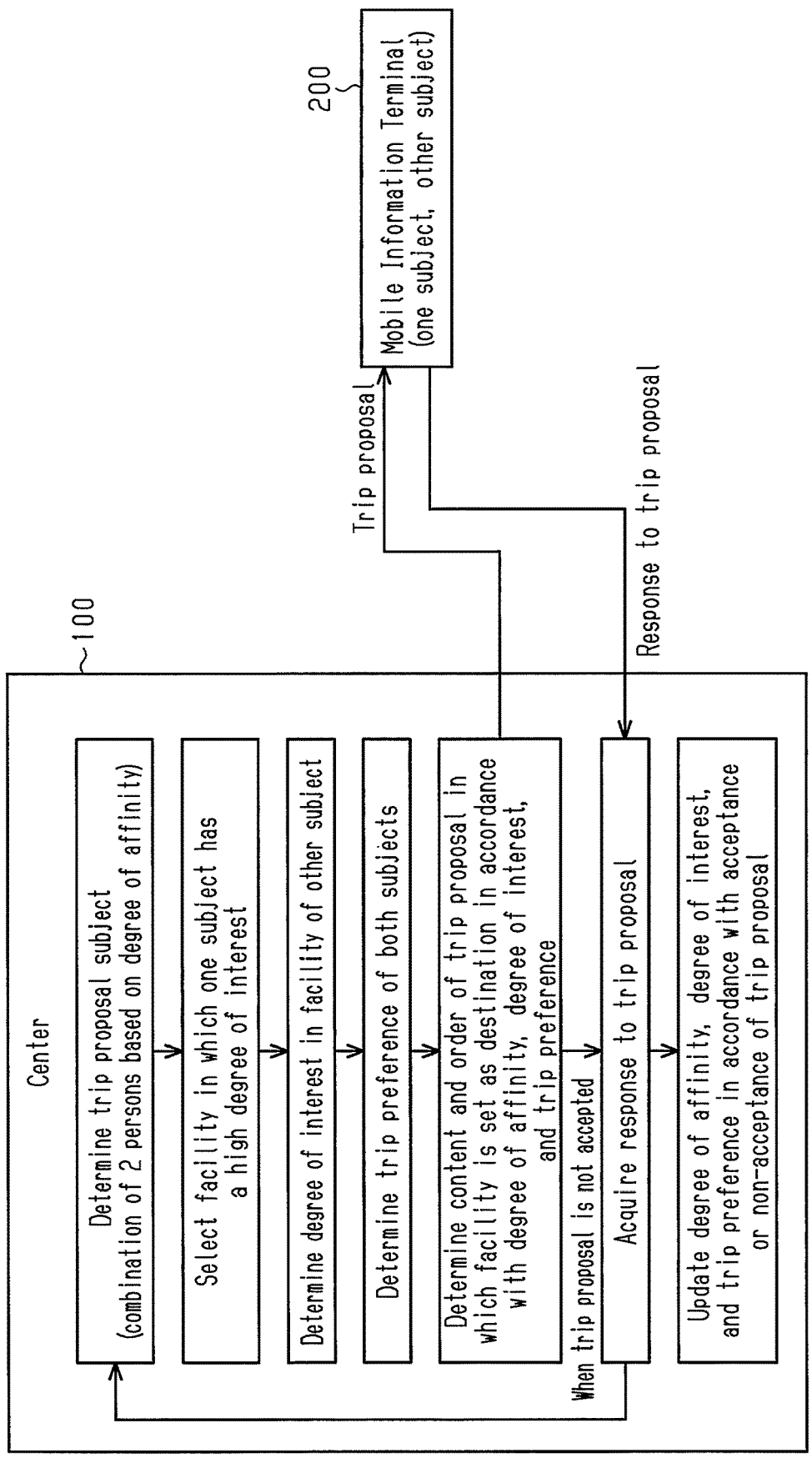
FIG. 1 is a diagram illustrating the flow of a process related to a trip proposal process executed by an information providing device according to a first embodiment.

Referring to FIG. 1, the information providing device is configured as a center 100 that manages information of multiple users possessing a mobile information terminal 200 such as a mobile phone, a tablet terminal, a wearable device, or a robot. The center 100 estimates a degree of affinity between the users in advance. The center 100 first determines two subject users who are subject to a trip proposal. Then, the center 100 sets a facility (location) in which a first one of the two subject users subject to the trip proposal has a high degree of interest as a destination of the trip proposal. With respect to the facility set as the destination, the center 100 acquires the degree of interest for the second one of the two subject users subject to the trip proposal. The center 100 estimates a trip preference, which is an index indicating the preference for taking trips, for the first and second users. The center 100 determines the trip proposal content when the facility is determined as the destination and the proposal order for the first and second users in accordance with the estimated degree of affinity between the first and second users, the degree of interest in the facility, and the trip preference. Then, the center 100 provides the mobile information terminals 200 possessed by the first and second users with a trip proposal based on the determined proposal contents and the proposal order. Thereafter, the center 100 acquires responses to the trip proposal from the first and second users through the mobile information terminals 200. When acquiring a response indicating that at least one of the users has not accepted the trip proposal, the center 100 reselects a combination of two users who are subject to a trip proposal and generates a new trip proposal. In contrast, when receiving responses to the trip proposal from the first and second users, the center 100 updates data related to the degree of interest between the first and second users, the degree of interest in the facility, and the trip preference for the first and second users.

The configuration of the device of the first embodiment will now be described with reference to the drawings.

Figure 2:
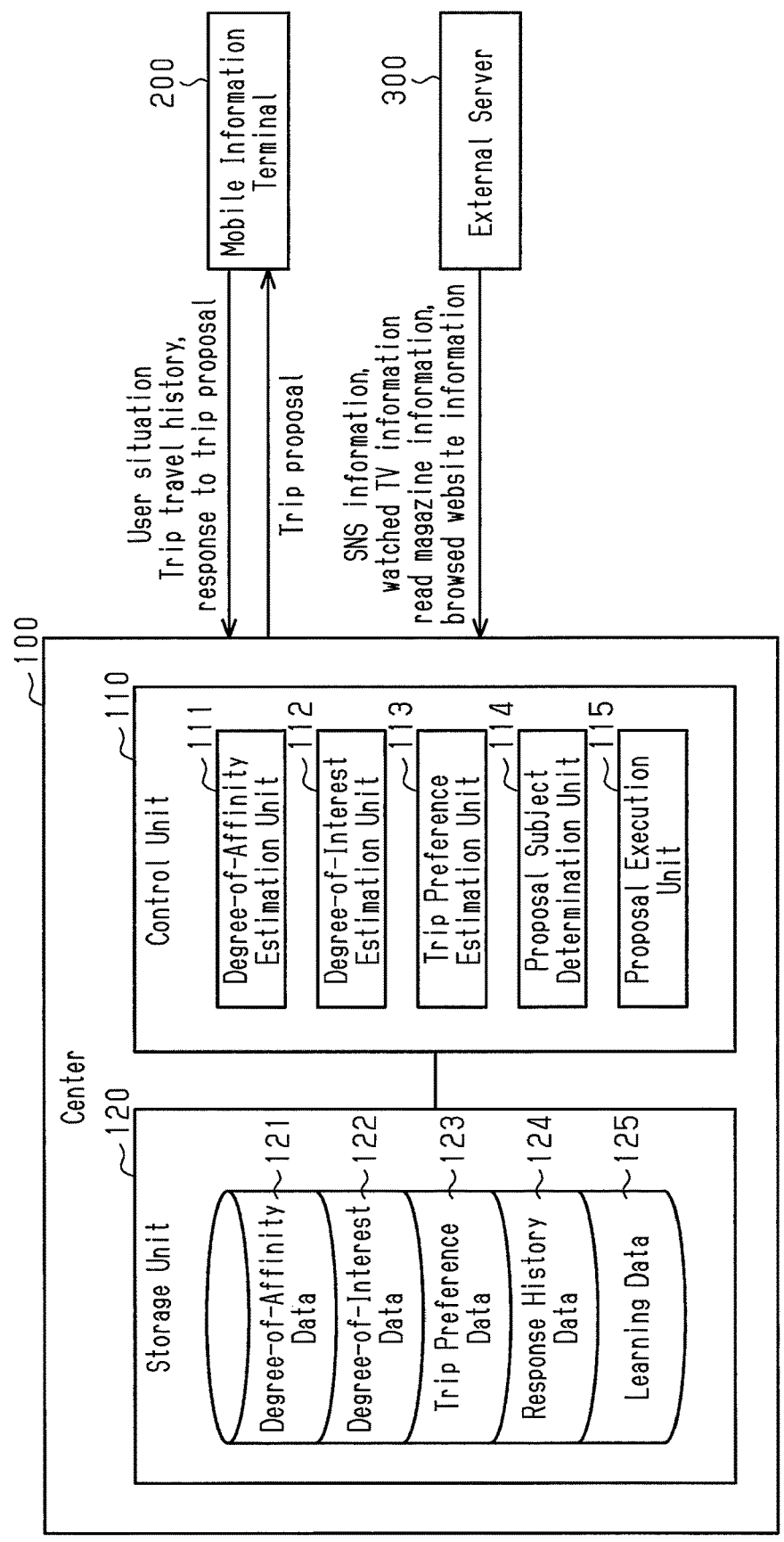
FIG. 2 is a schematic block diagram illustrating the configuration of the information providing device of FIG. 1.

Referring to FIG. 2, the center 100 includes a control unit 110 that controls a trip proposal process and a storage unit 120 that stores an information providing program executed by the control unit 110 in the trip proposal process and various kinds of data which are read or written by the control unit 110 when the information providing program is executed. Further, when executing the information providing program stored in the storage unit 120, the control unit 110 functions as a degree-of-affinity estimation unit 111, a degree-of-interest estimation unit 112, a trip preference estimation unit 113, a proposal subject determination unit 114, and a proposal execution unit 115. The center 100 may be configured as a circuitry including 1) one or more dedicated hardware circuits such as an ASIC, 2) one or more processors operating in accordance with a computer program (software), or 3) a combination thereof. The processor includes a CPU and memories such as a RAM and a ROM. The memory stores program codes or commands that have the CPU execute processing. A memory or a computer readable medium includes any applicable media that can be accessed by a versatile or dedicated computer.

The degree-of-affinity estimation unit 111 acquires information related to friendship between the users that are registered to a social network service (SNS) or the like, information related to the history of messages exchanged between the users through the SNS, or the like from an external server 300. Then, the degree-of-affinity estimation unit 111 estimates the degree of affinity between the users based on the acquired information and stores degree-of-affinity data 121, which has been obtained through the estimation, in the storage unit 120.

FIG. 3 illustrates an example of a data table used by the degree-of-affinity estimation unit 111 to estimate the degree of affinity of the users. For each set of user IDs of two users among the user IDs registered in the center 100, the data table of the example illustrated in FIG. 3 indicates whether or not the two users are registered as friends to the SNS in addition to the frequency of exchange of messages. When two users are registered as friends to the SNS and exchange messages at a relatively high frequency, the degree-of-affinity estimation unit 111 estimates that the degree of affinity between the users is greater than or equal to a second degree-of-affinity threshold value and thus high. In contrast, when two users are registered as friends to the SNS but exchange messages at a relatively low frequency, the degree-of-affinity estimation unit 111 estimates that the degree of affinity between the users is greater than or equal to a first degree-of-affinity threshold value but less than the second degree-of-affinity threshold value and thus moderate. Further, when two users have not been registered as friends to the SNS, the degree-of-affinity estimation unit 111 estimates that the degree of affinity between the users is less than the first degree-of-affinity threshold value and thus low.

The degree-of-interest estimation unit 112 acquires information from the external server 300 indicating the preferences of a user such as information of programs watched on the television, read magazine information, browsed website information, or the like in addition to information exchanged with friends on the SNS. The read magazine information is acquired from, for example, the history of magazines purchased by the user, the history of electronic books read with the mobile information terminal 200, or the like. Then, the degree-of-interest estimation unit 112 estimates the degree of interest of the user for each facility based on the acquired information and stores degree-of-interest data 122 obtained by the estimation in the storage unit 120.

FIG. 4 illustrates an example of a data table used by the degree-of-interest estimation unit 112 to estimate the degree of interest of the user in each facility. In the data table of the example illustrated in FIG. 4, the frequency keywords related to a facility appear on the SNS and the frequency television, magazines, and websites related to the facility have been viewed are registered for each facility registered in advance for multiple user IDs registered to the center 100. Further, when the appearance frequency of keywords related to the facility on the SNS and the viewing frequency of television, magazines, or website related to the facility are both relatively high, the degree-of-interest estimation unit 112 estimates that the degree of interest of the user in the facility is greater than or equal to a predetermined degree-of-interest threshold value and thus high. When one of the appearance frequency and the viewing frequency is relatively low, the degree-of-interest estimation unit 112 estimates that the degree of interest of the user in the facility is less than the predetermined degree-of-interest threshold value and thus moderate. When the appearance frequency and the viewing frequency are both relatively low, the degree-of-interest estimation unit 112 estimates that the degree of interest of the user in the facility is less than the predetermined degree-of-interest threshold value and thus low.

Referring to FIG. 2, the trip preference estimation unit 113 acquires data related to the travel history of trips taken by the user including data related to burden when the user went from the mobile information terminal 200 possessed by the user. The trip preference estimation unit 113 estimates a trip preference, which is an index indicating the how much the user likes to take trips, based on the acquired data related to the burden and stores the trip preference data 123 obtained by the estimation in the storage unit 120. In this case, the trip preference estimation unit 113 compares the burden of different users when taking the same trip under the same conditions. When the burden on a subject user is smaller than other users, the trip preference of the subject user is high. In other words, the trip preference is estimated using the fact that the burden relatively decreases (increases) as the trip preference of the user relatively increases (decreases).

FIG. 5 illustrates exemplary characteristic quantities characterizing the burden when the user goes out. As shown in FIG. 5, examples of the characteristic quantities include the type of traveling means, travel purpose, weather, temperature, road environment when using a car as the traveling means, usage mode of traveling means, accustomed degree of travel route, usage time of the traveling means, waiting time required to use traveling means, and calories consumed when using the traveling means. The various kinds of characteristic quantities illustrated in FIG. 5 are combined to define states.

FIG. 6 illustrates an example of a data table used by the trip preference estimation unit 113 to estimate the trip preference of the user. The data table of the example illustrated in FIG. 6 indicates travel routes of the user, the characteristic quantities for each state included in the travel routes, and the burden on the user for each state. The example in FIG. 6 illustrates a travel route used when commuting to work, a travel route used for shopping, and a travel route used when traveling for pleasure.

The travel route used for commuting includes a travel section in which the user walks from "home" to "station A," a travel section in which the user rides a train from "station A" to "station B," a travel section in which the user changes trains and then rides the train from "station B" to "station C," and a travel section in which the user walks from "station C" to "workplace." Situations of the user when moving in each travel section are taken into account when setting the states included in the travel route for commuting.

Figures 7, 8:
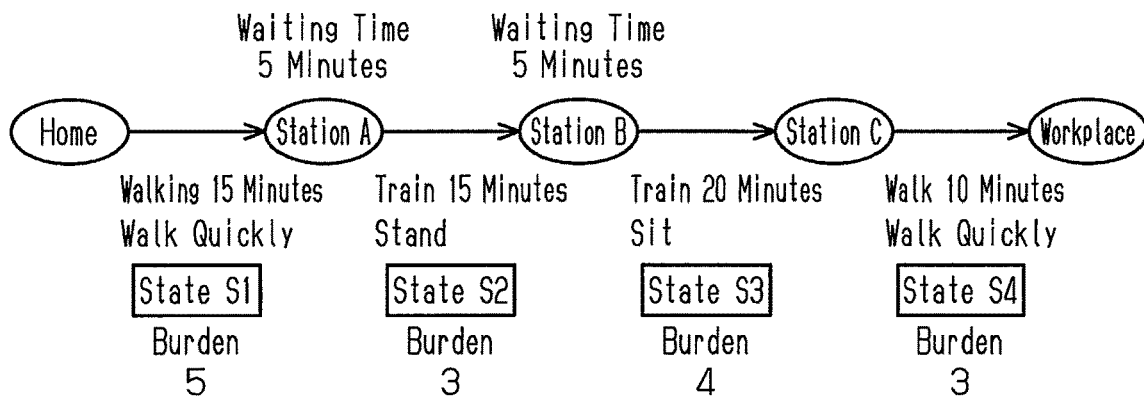
FIG. 7 is a diagram illustrating the burden on a user in each state included in a travel route.
FIG. 8 is a diagram illustrating an example of the burden on different users for different states.

FIG. 7 illustrates the burden on the user for each state included in the travel route for commuting that is illustrated in FIG. 6. In the example illustrated in FIG. 7, the travel route used for commuting includes a travel section from "home" to "station A," a travel section from the "station A" to a "station B," a travel section from "station B" to "station C," and a travel section from "station C" to a "workplace." The states respectively correspond to the travel sections. Further, "5," "3," "4," and "3" are used as evaluation values of the burden for each state.

FIG. 8 is a data table listing the burden of each state for multiple users. As shown in FIG. 8, different users tend to feel burden in a common manner for the same state. Nevertheless, in this example, when comparing the burden for states "S1" to "S3" on three users allocated IDs of "ID1,", "ID2," and "ID3," the order of users feeling a higher burden is "ID 3," "ID 1," and "ID 2." Such slight difference between users occurs because one user may like to take trips while another may not like to take trips and feel burdensome when doing so.

Figure 9:
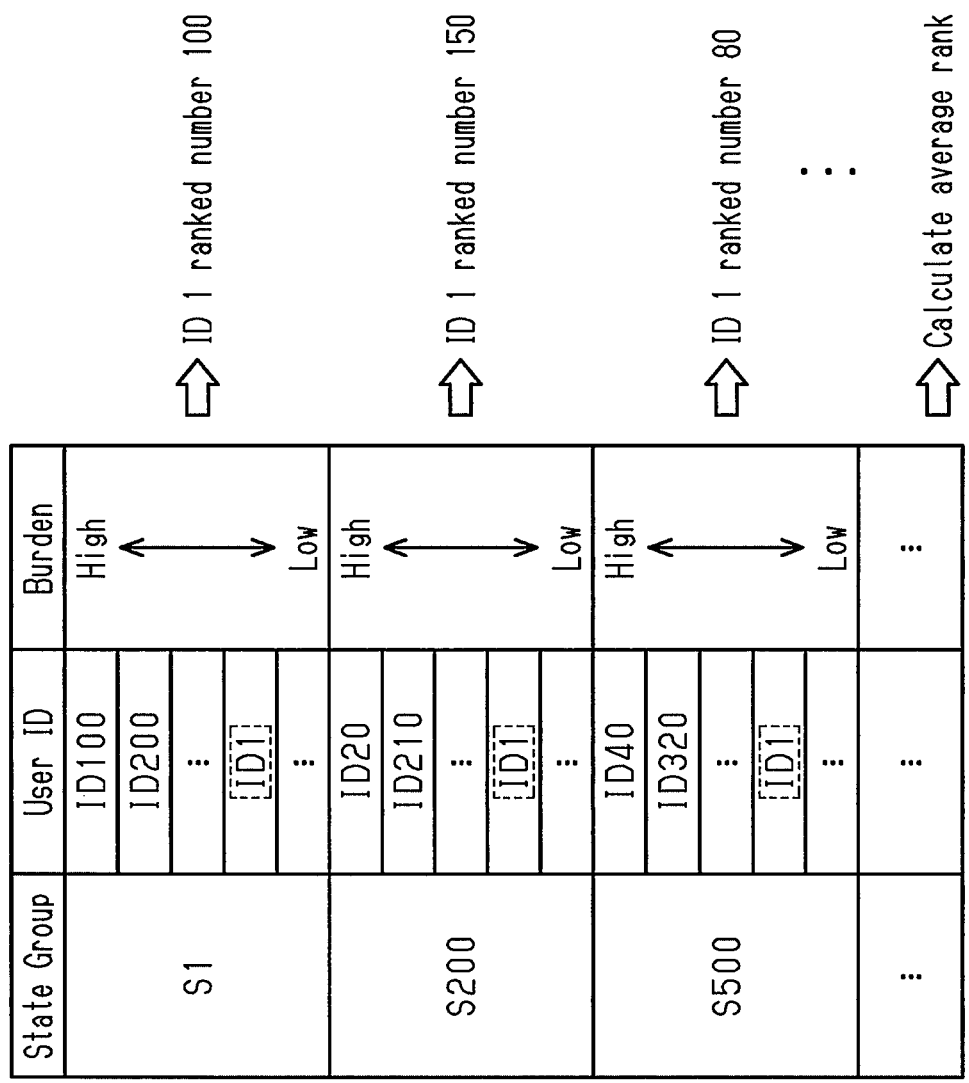
FIG. 9 is a diagram illustrating the flow of a process for estimating a trip preference of a user.

Next, a process for estimating the trip preference with the trip preference estimation unit 113 will be described with reference to FIG. 9. As illustrated in FIG. 9, the trip preference estimation unit 113 first selects a state group when estimating the trip preference. The state group includes a plurality of states. In the example illustrated in FIG. 9, the state group includes state "S1," state "S200," and state "S500." The trip preference estimation unit 113 ranks users in order from those that feel a higher burden for each state included in the selected state group. Further, the trip preference estimation unit 113 obtains the rank of a user in the selected state group that is subject to the trip preference estimation. Then, the trip preference estimation unit 113 obtains the average rank in the plurality of states included in the selected state group as the trip preference for the user who is subject to the estimation. In the first embodiment, the trip preference estimation unit 113 estimates that the trip preference of the user is high when the estimation value of the trip preference is greater than or equal to a predetermined trip preference threshold value. In contrast, when the estimation value of the trip preference is less than the predetermined trip preference threshold value, the trip preference estimation unit 113 estimates that the trip preference of the user is moderate or low. The burden for each user is not necessarily obtained for all the states included in the state group. Therefore, the number of users compared is not necessarily the same for each state included in the state group. The trip preference estimation unit 113 may perform weight the ranking of the user for each state in view of the number of users compared for each of the states included in the state group and then estimate the trip preference of the user.

As illustrated in FIG. 2, the proposal subject determination unit 114 selects a combination of the user IDs of two users that are subject to the trip proposal from the user IDs registered in the center 100 based on the degree-of-affinity data 121 stored in the storage unit 120. Specifically, the proposal subject determination unit 114 refers to the data table illustrated in FIG. 3 and selects a combination of two user IDs in which the estimation value of the degree of affinity between the corresponding users is greater than or equal to the first degree-of-affinity threshold value.

The proposal execution unit 115 sets a facility in which the first one of the two users subject to the trip proposal has a high degree of interest as a destination of the trip proposal. Then, the proposal execution unit 115 determines the proposal content and the proposal order related to a proposal for a trip to the set destination based on the degree-of-affinity data 121, the degree-of-interest data 122, and the trip preference data 123 stored in the storage unit 120.

Figure 10:
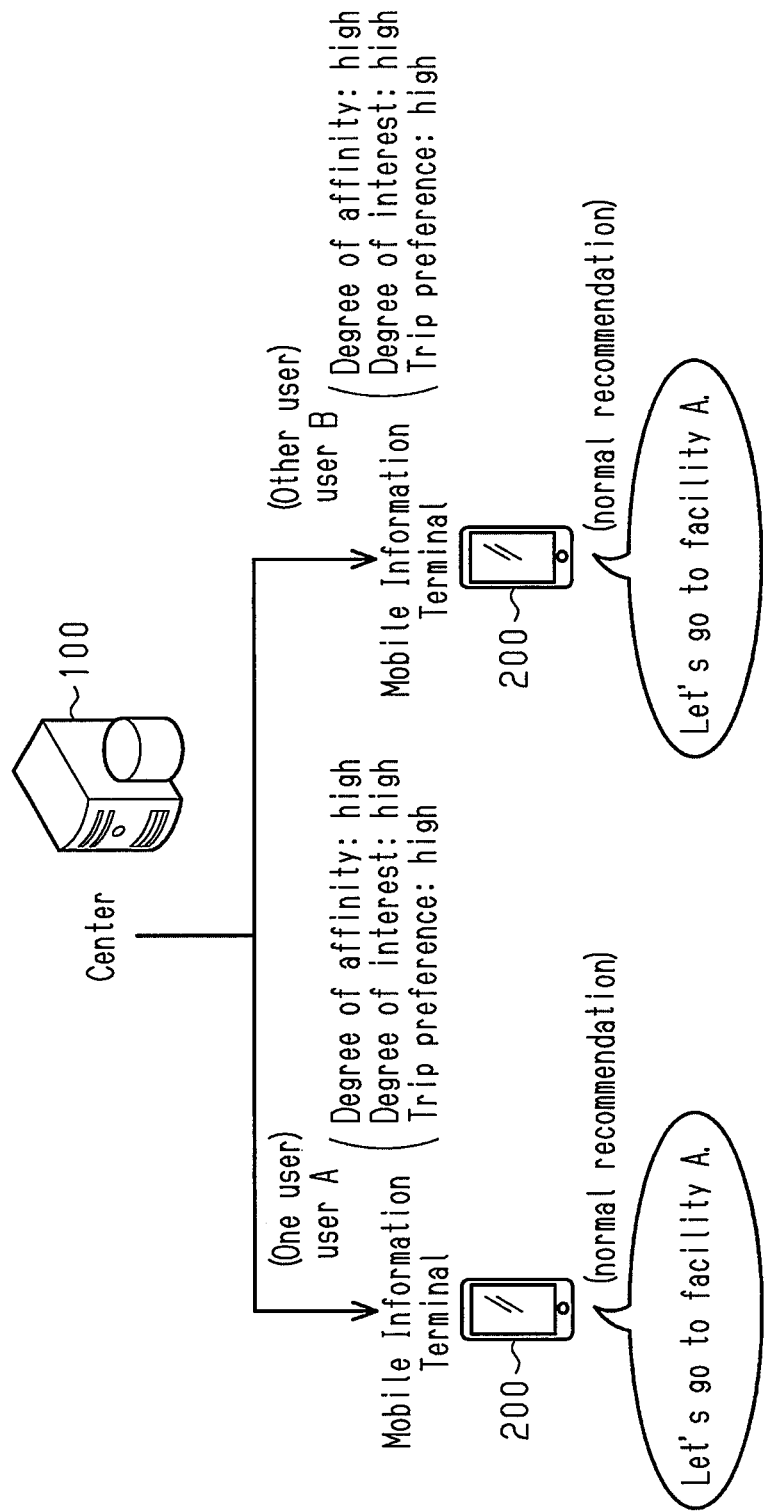
FIG. 10 is a diagram illustrating one example of a trip proposal provided by the information providing device of FIG. 1.

Specifically, as illustrated in FIG. 10, when the degree of affinity between the first and second users and the degree of interest and trip preferences of the first user are all high, the proposal execution unit 115 issues a "normal recommendation" to the first user. In the same manner, when the degree of affinity between the first and second users and the degree of interest and trip preference of the second user are all high, the proposal execution unit 115 issues the "normal recommendation" to the second user. In the "normal recommendation," the proposal execution unit 115 provides the user with a short message (proposal content) recommending a trip to the facility that has been selected as the destination. The "normal recommendation" is suitable for a user who is likely to accept the trip proposal because the user would feel bothersome of the message is long. Further, when the "normal recommendation" is issued to the first and second users, the proposal execution unit 115 does not restrict the order for issuing the proposal to the first and second users. Therefore, the proposal execution unit 115 sequentially issues the trip proposal whenever suitable for the first and second users.

Figure 11:
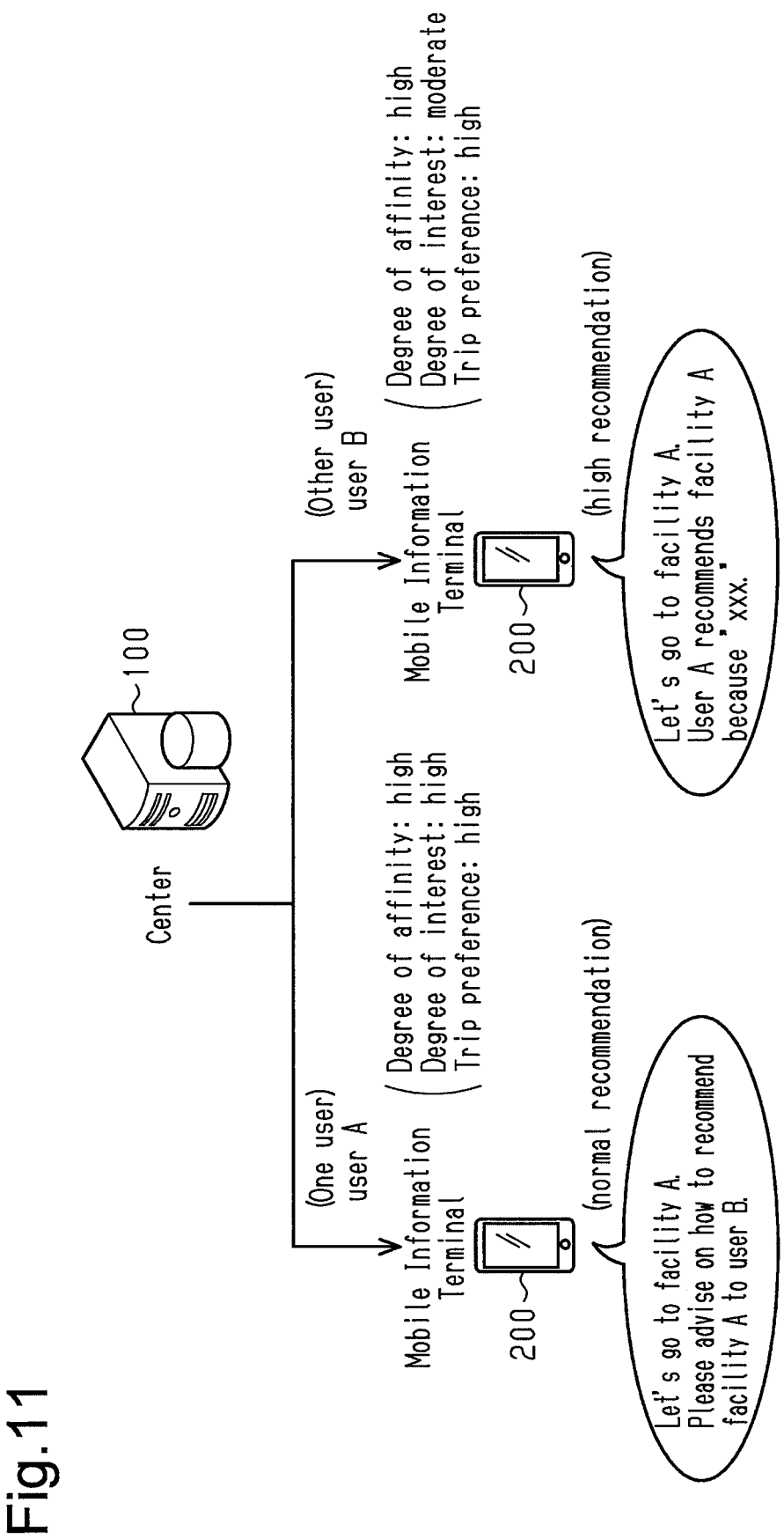
FIG. 11 is a diagram illustrating another example of a trip proposal provided by the information providing device of FIG. 1.

Further, as illustrated in FIG. 11, when the degree of affinity between the first and second users is high and the degree of interest of the first user is high but the degree of interest of the second user is medium or low, the proposal execution unit 115 gives a "high recommendation" to the second user. In the "high recommendation," the proposal execution unit 115 provides a message (proposal content) prompting the second user to go on the trip and includes information recommending the facility from the first user having a high degree of interest in the facility. For this reason, the second user who initially did not have a high degree of interest in the facility will be attracted to the facility and more likely accept the trip proposal. Thus, in the "high recommendation," the degree of recommendation of the trip proposal is higher than the "normal recommendation." In the first embodiment, the proposal execution unit 115 gives the "high recommendation" under the condition that the degree of affinity between the users is high as described above. This is because when the degree of affinity between the first and second users is moderate, even when the second user is given the recommendation information for the facility selected as the destination from the first user having a high degree of interest in the facility, the second user may not be attracted to the facility. Further, like in the example illustrated in FIG. 11, when the "high recommendation" is issued, it is necessary for the proposal execution unit 115 to first make an inquiry to the first user having a high degree of interest in the facility selected as the destination on the recommendation information of the facility. For this reason, the proposal execution unit 115 sets the trip proposal order so that the trip proposal is issued to the first user through the "normal recommendation" and then issued to the second user through the "high recommendation" to the second user. Therefore, the proposal execution unit 115 first issues the "normal recommendation" to the first user including the inquiry about the recommendation information of the facility. Then, the proposal execution unit 115 issues the "high recommendation" to the second user including the recommendation information of the facility obtained through the inquiry.

When at least one of the degree of affinity between the users, the degree of interest, and the trip preference of at least one of the first and second users is moderate or low, the proposal execution unit 115 gives a "piggyback recommendation" to the users. For example, the proposal execution unit 115 gives the "piggyback recommendation" to the first and second users when the degree of affinity between the first and second users is moderate, gives the "piggyback recommendation" to the second user when the degree of interest of the second user is moderate or less, and gives the "piggyback recommendation" to at least one user when the trip preference of at least one user is moderate or low. As shown in the example of FIG. 12, the proposal execution unit 115 gives the "piggyback recommendation" to the second user when the trip preference of user B who is the second user is moderate. Here, the proposal execution unit 115 adds a facility that differs from the originally set facility as another destination in the "piggyback recommendation." In detail, the added facility is a facility in which the user provided with the "piggyback recommendation" has a high degree of interest. Further, the added facility is located near the facility originally set as the destination in map data. For this reason, the user who is initially not attracted to the facility originally set as the destination becomes more likely to accept the trip proposal when the facility in which the user has a high degree of interest is added as the destination. Thus, in the "piggyback recommendation," the degree of recommendation of trip proposal is higher than the "normal recommendation." When the proposal execution unit 115 gives the "piggyback recommendation" like in the example illustrated in FIG. 12, no message is exchanged between the users unlike the "high recommendation." Thus, a rule in the proposal order does not necessarily have to be set for the first and second users. However, when the "normal recommendation" is given to the first user and the "piggyback recommendation" is given to the second user like in the example illustrated in FIG. 12, the proposal execution unit 115 sets the trip proposal order so that the trip proposal is given to the second user before the first user. In other words, the proposal execution unit 115 first gives the trip proposal to the user who is relatively unlikely to accept the trip proposal and then gives the trip proposal to the remaining user after the trip proposal is accepted. This reduces unnecessary tasks such as providing the user who has accepted the trip proposal with another trip proposal.

The proposal execution unit 115 may give both of the "high recommendation" and the "piggyback recommendation" to the first or second user depending on the degree of affinity, the degree of interest, and the trip preference of the first and second users. When the "high recommendation" and the "piggyback recommendation" are both given, the proposal execution unit 115 determines the proposal order based on the "high recommendation" rather than the "piggyback recommendation." Thus, the proposal execution unit 115 first issues the "normal recommendation" including the inquiry about the recommendation information of the facility to the first user. Then, the proposal execution unit 115 gives the "high recommendation" and the "piggyback recommendation" including the recommendation information of the facility obtained through the inquiry and the newly added destination to the second user.

FIG. 13 illustrates a list of corresponding relationships between the degree of affinity, the degree of interest, and the trip preference of the two users who are subject to the trip proposal, the trip proposal content, and the proposal order. As illustrated in FIG. 13, the proposal execution unit 115 gives an appropriate trip proposal to each user in accordance with the degree of affinity between the first and second users subject to the trip proposal and the degree of interest and the trip preference of the first and second users.

As illustrated in FIG. 2, the proposal execution unit 115 acquires data related to a situation of the user from the mobile information terminal 200 and determines when to give the trip proposal to the user based on the acquired user situation. In this case, when the situation of the user not suitable for the trip proposal, for example, when the user is eating, watching television, sleeping, or the like, the proposal execution unit 115 does not give the trip proposal. Then, when the situation of the user becomes the timing suitable for the trip, the proposal execution unit 115 gives the trip proposal to the user through the mobile information terminal 200 in accordance with the proposal content and the proposal order determined by the proposal execution unit 115 as described above.

The proposal execution unit 115 receives responses to the trip proposal from the mobile information terminals 200 possessed by the first and second users and stores response history data 124 of the received responses in the storage unit 120. Further, the proposal execution unit 115 updates the data related to the degree of affinity between the first and second users and the degree of interest in the facility and the trip preference of the first and second users based on the response history data 124 and store the updated data in the storage unit 120 as learning data 125.

Specifically, when a response indicating that the trip proposal has been accepted is received from each of the first and second users, the proposal execution unit 115 corrects and increases the degree of affinity of the first and second users since a sense of closeness between the first and second users is considered to have increased. Furthermore, the proposal execution unit 115 corrects and increases the degree of interest in the facility since the degree of interest of the first and second users in the facility set as the destination is considered to have increased. Furthermore, the proposal execution unit 115 corrects and increases the trip preference of the first and second users since the first and second users are considered to be attracted to the trip proposal and wish more actively to take a trip than before.

Further, when a response indicating that the trip proposal has not been accepted is received from one of the first and second users and a response indicating that the trip proposal has been accepted is received from the other of the first and second users, the proposal execution unit 115 corrects and decreases the degree of affinity between the first and second users since the sense of closeness between the first and second users is considered to have decreased. Further, the proposal execution unit 115 corrects and increases the degree of interest in the facility of the user who has accepted the trip proposal since the degree of interest of the user who has accepted the trip proposal in the facility set as the destination is considered to have increased. In contrast, the proposal execution unit 115 corrects and decreases the degree of interest in the facility of the user who has not accepted the trip proposal since the degree of interest of the user who has not accepted the trip proposal in the facility set as the destination is considered to have decreased. Further, the proposal execution unit 115 corrects and increases the trip preference of the user who has accepted the trip proposal since the user who has accepted the trip proposal is considered to be attracted to the trip proposal and wishes more actively to take a trip than before. In contrast, the proposal execution unit 115 corrects and decreases the trip preference of the user who has not accepted the trip proposal since the user who has not accepted the trip proposal is considered not to be attracted to the trip proposal is still passive with regard to taking a trip.

Further, when a response indicating that the trip proposal has not been accepted is received from each of the first and second users, the proposal execution unit 115 corrects and decreases the degree of affinity between the first and second users since the sense of closeness of the first and second users is considered to have decreased. Furthermore, the proposal execution unit 115 corrects and decreases the degree of interest of the first and second users in the facility since the degree of interest of the first and second users in the facility set as the destination is considered to have decreased. Further, the proposal execution unit 115 corrects and decreases the trip preference of the first and second users since the first and second users are considered not to be attracted to the trip proposal and are still passive with regard to taking a trip.

Here, depending on the trip proposal order for the first and second users, the proposal execution unit 115 may not give the trip proposal to the remaining user when a response indicating that the trip proposal has not been accepted is received from the user that was given the proposal first. In this case, the proposal execution unit 115 corrects and decreases the degree of affinity between the first and second users, the degree of interest of the user who has not accepted the trip proposal for the facility selected as the destination, and the trip preference of the user who has not accepted the trip proposal. In contrast, since the trip proposal is not given to the remaining user, a response to the trip proposal has not received. Thus, the proposal execution unit 115 does not update the degree of interest of the user who has not been given the trip proposal in the facility set as the destination and the trip preference of the user who has not been given the trip proposal.

In other words, in the first embodiment, the proposal execution unit 115 corrects and decreases the degree of affinity between the users when at least one of the users who are subject to the trip proposal does not accept the trip proposal. In contrast, the proposal execution unit 115 updates the degree of interest in the facility set as the destination and the trip preference for each user depending on whether or not the trip proposal has accepted.

When a response indicating that the trip proposal has not been accepted is received from at least one of the first and second users, the proposal execution unit 115 updates the data of the degree of affinity between the first and second users and the degree of interest and the trip preference of the user who has not accepted the trip proposal as described above. Then, the proposal execution unit 115 determines whether or not to change the trip proposal content for the user who has not accepted the trip proposal based on the data of the updated degree of affinity, the degree of interest, and the trip preference. As a result, when the trip proposal content is changed, the proposal execution unit 115 gives a new trip proposal to the user who has not accepted the trip proposal with the changed proposal content. In contrast, when the trip proposal content is not changed, the proposal execution unit 115 instructs the proposal subject determination unit 114 to change the person subject to the trip proposal.

Next, the specific processing procedures of the trip proposal process executed by the center 100, which functions as the information providing device in cooperation with the mobile information terminal 200, will be described. The center 100 executes the trip proposal process illustrated in FIG. 14 in predetermined cycles.

Figure 14:
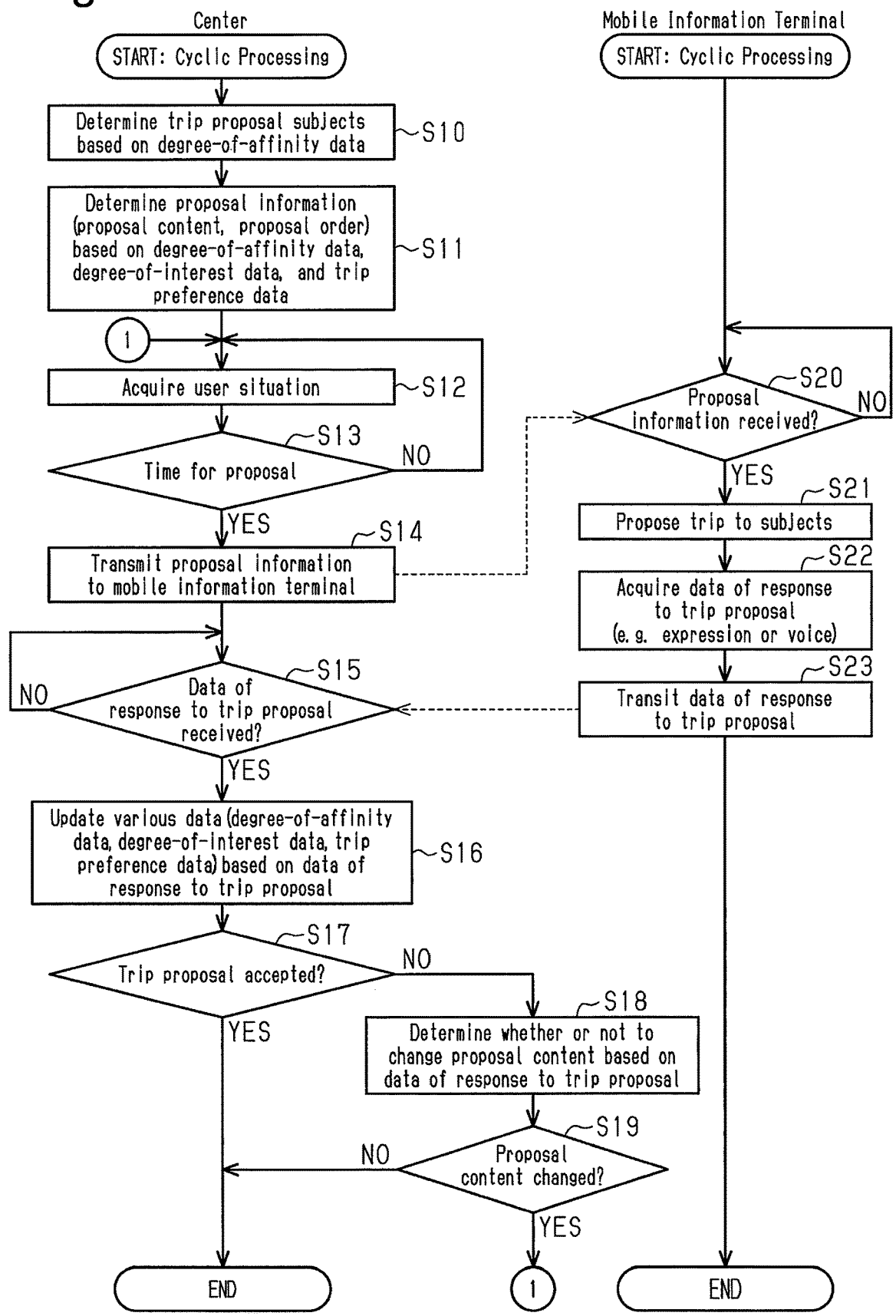
FIG. 14 is a flowchart illustrating the process contents of a trip proposal process executed by the information providing device of FIG. 1.

As illustrated in FIG. 14, in the trip proposal process, from the combinations of users registered to the center 100, the proposal subject determination unit 114 of the center 100 determines a combination of two users subject to a trip proposal based on the degree-of-affinity data 121 stored in the storage unit 120 (step S10).

Then, the proposal execution unit 115 of the center 100 determines trip proposal information for the combination of the two users determined in step S10 based on the degree-of-affinity data 121, the degree-of-interest data 122, and the trip preference data 123 stored in the storage unit 120 (step S11). Specifically, the trip proposal information includes the trip proposal content and the proposal order.

Then, the center 100 acquires the situation of the user subject to the trip proposal from the mobile information terminal 200 (step S12). When the situation of the user is determined not to be appropriate for the trip proposal (NO in step S13), the center 100 returns to step S12 and acquires the situation of the user subject to the trip proposal from the mobile information terminal 200. In other words, the center 100 repeatedly acquires the situation of the user from the mobile information terminal 200 until the situation of the user becomes appropriate for a trip proposal (YES in step S13). When determining that the situation of user is suitable for a trip proposal (YES in step S13), the center 100 transmits the proposal information determined in step S11 from the proposal execution unit 115 to the mobile information terminal 200 (step S14). Thereafter, the center 100 waits until data of a response to the trip proposal is received from the mobile information terminal 200 (NO in step S15).

When the trip proposal information is received from the center 100 (YES in step S20), the mobile information terminal 200 gives the trip proposal to the user based on the received proposal information (step S21).

Further, the mobile information terminal 200 acquires the response data of the user to the trip proposal based on the expression or voice of the user when the trip proposal is given to the user (step S22). The response data of the user includes data indicating whether or not the user has accepted the trip proposal. Then, the mobile information terminal 200 transmits the response data, which is acquired from the user, to the center 100 (step S23).

When the response data to the trip proposal is received from the mobile information terminal 200 (YES in step S15), the center 100 updates the degree-of-affinity data 121, the degree of interest data 122, and the trip preference data 123 related to the two users subject to the trip proposal based on the received response data with the proposal execution unit 115 (step S16).

Thereafter, when determining from the response data to the trip proposal that the trip proposal has been accepted by both of the users (YES in step S17), the center 100 ends the trip proposal process illustrated in FIG. 14.

When determining that the trip proposal has not been accepted by at least one user based on the response data to the trip proposal (NO in step S17), the center 100 determines whether or not to change the proposal content based on the update of the degree-of-affinity data 121, the degree-of-interest data 122, and the trip preference data 123 for to the two users in step S16 with the proposal execution unit 115 (step S18). Then, when determining that the proposal content has not been changed (NO in step S19), the center 100 ends the trip proposal process illustrated in FIG. 14.

When determining that the proposal content has been changed (YES in step S19), the center 100 returns to step S12. Then, the center 100 gives the new trip proposal to the combination of the two users determined in step S10 with the changed proposal content.

Thereafter, the center 100 repeats the process of step S12 to step S19. When the trip proposal is accepted by the first and second users in step S17 (YES in step S17) or when determining in step S19 that there the trip proposal content has not been changed based on the response data from the user (NO in step S19), the center 100 ends the trip proposal process illustrated in FIG. 14.

Next, the operation of the information providing device according to the first embodiment will now be described focusing on when the center 100 gives a trip proposal to the user of the mobile information terminal 200 in cooperation with the mobile information terminal 200.

Generally, a user is more likely to be attracted to a trip when multiple users take the trip than when the user takes a trip alone. Therefore, when the trip proposal is given to the user, the trip proposal is more likely to be accepted by a user when the trip proposal is given to multiple users than when the trip proposal is given to an individual user.

In this regard, the center 100 acquires the degree-of-affinity data 121 of multiple users in advance and determines a combination of two users subject to the trip proposal based on the degree of affinity. Accordingly, even when a user initially has no intention to take a trip, the trip proposal is more likely to be accepted if the other user will take the trip. Further, since the user is prompted to take this opportunity to go on a trip, the user will use a car more frequently.

The center 100 sets a facility in which the first user has a high degree of interest as the destination when the trip proposal is given to the two users. Thus, the first user is likely to be attracted to the trip proposal. However, the second user would not necessarily have a high degree of interest in the facility that is set as the destination.

In this regard, the center 100 changes the trip proposal content in accordance with the data of the degree of affinity between the users, the degree of interest of the user in the facility, and the trip preference of the users. Then, when the user is determined as being unlikely to accept the trip proposal, the center 100 provides the user with a trip proposal in which the degree of recommendation is increased. Accordingly, the first and second users are likely to be attracted to the trip proposal, and the user is further prompted to take this opportunity and go on a trip. Further, the second user is provided with an opportunity to find a new value in the facility that the user was not aware of and allows the second user to go to more places.

Particularly, the combination of two users subject to the trip proposal is not necessarily limited to a combination of users with a high degree of affinity and may be a combination of users with a moderate degree of affinity. Further, when the trip proposal is given to the combination of users, the center 100 gives the trip proposal in a manner strongly recommending the trip as described above. Accordingly, the user is likely to be attracted to the trip proposal, and amity between the users is deepened.

Further, the two users subject to the trip proposal are not necessarily limited to users having a high trip preference and may be users having a moderate or low trip preference. Further, even when the trip proposal is given to such users, the center 100 gives the trip proposal in a manner strongly recommending the trip as described above. Accordingly, the users are likely to be attracted to the trip in addition to the content of the trip proposal content. This would lead to an increase in the trip preference of the user. As a result, the user will use a car more frequently.

The first embodiment has the advantages described below.

(1) Multiple users are subject to the trip proposal. Thus, a user who has not determined where to go is likely to accept the trip proposal if the other user will take a trip. Therefore, in contrast with when the trip proposal is given to a single user, the user can be further prompted to take a trip. This, for example, increases the opportunities for the user to use a car. In this case, a facility in which at least one of the users subject to the trip proposal has a degree of interest that is greater than or equal to a predetermined degree-of-interest threshold value is set as a destination. Further, among the users subject to the trip proposal, a user who is unlikely to accept the trip proposal if provided with a trip proposal in which the degree of recommendation of the trip has been increased. Specifically, when the user is unlikely to accept the trip proposal, the degree of interest in the facility set as the destination is less than a predetermined degree-of-interest threshold value, and/or the trip preference is less than a predetermined trip preference threshold value. Accordingly, in contrast with when the users subject to the trip proposal are provided with the same trip proposal, the first embodiment increases the possibility that the trip proposal will be accepted and effectively prompts the user to take a trip.

(2) The trip preference is estimated as an index indicating the degree of preference of the user to take trips based on the data of the burden on the user when the user takes a trip. Further, the trip proposal content is changed in accordance with the trip preference estimated as described above. This effectively prompts the user to take a trip.

(3) Among the users subject to the trip proposal, a user who is unlikely to accept the trip proposal is provided with a trip proposal including a facility that the user has a high interest in as an additional destination. Specifically, when the user who is unlikely to accept the trip proposal, the degree of interest in the facility set as the destination is less than a predetermined degree-of-interest threshold value, and/or the trip preference is less than a predetermined trip preference threshold value. Accordingly, the trip proposal is given to satisfy a potential demand of the user who is unlikely to accept the trip proposal. This further effectively prompts the user to take the trip.

(4) A user having a high degree of interest in the facility set as the destination is likely to know attractive points of the facility. When a user having a high degree of interest in the facility that is set as the destination and a user having a low degree of interest in the same facility are the users subject to the trip proposal, specific individual recommendation information from the user having the high degree of interest is added to the trip proposal given to the user having the low degree of interest. Accordingly, the user having a low degree of interest in the facility set as the destination is likely to be attracted to the facility set as the destination. This effectively prompts the user to take a trip.

(5) A user having a low degree of interest in the facility set as the destination is provided with a trip proposal including recommendation information added by a user having a high degree of affinity. Therefore, the user having a low degree of interest in the facility set as the destination is likely to be attracted to the same facility. This prompts the user to take a trip in a further preferred manner.

(6) For a user who has not accepted a trip proposal, corrections are made to decrease the degree of affinity, the degree of interest, and the trip preference that are parameters used to specify the trip proposal content. Therefore, such a user is subsequently provided with a trip proposal having an increased degree of recommendation. Therefore, as compared with when trip proposals of the same content are repeatedly given to each user, the user is more likely to accept the trip proposal. This prompts the user to take a trip in a further effective manner.

(7) Even when a user does not accept a trip proposal, trip proposals are repeatedly given to the same user with different proposal contents. Therefore, as compared with when each user is provided with a trip proposal only once under a certain situation, the user is more likely to accept the trip proposal. This prompts the user to take a trip in a further effective manner.

Second Embodiment

An information providing device according to a second embodiment will now be described with reference to the drawings. The second embodiment differs from the first embodiment in that the trip proposal content and the proposal order are determined taking into account the physical ability and possession of a car in addition to the degree of affinity, the degree of interest, and the trip preference of the users. The following description will focus on points that differ from the first embodiment.

Figure 15:
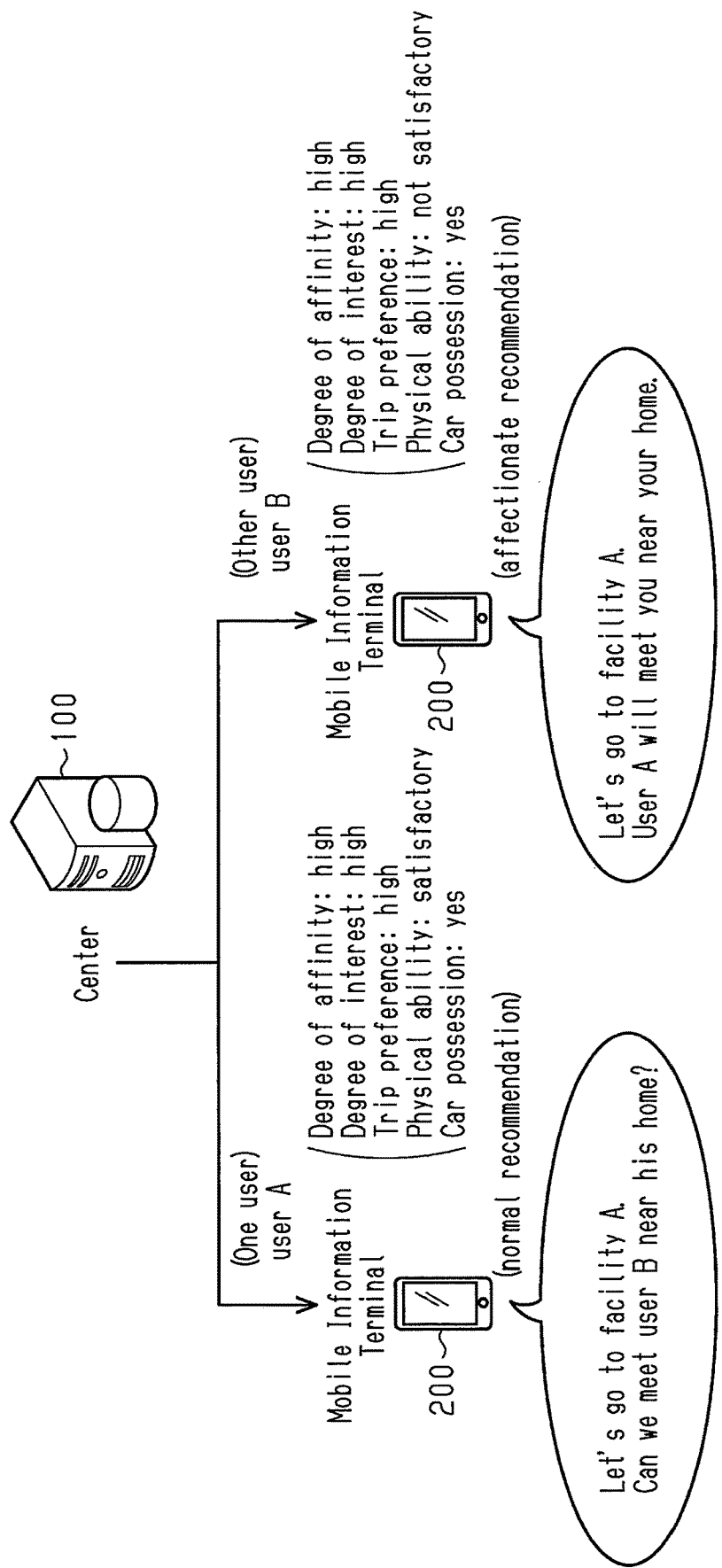
FIG. 15 is a diagram illustrating one example of a trip proposal provided by an information providing device according to a second embodiment.

Referring to FIG. 15, in the second embodiment, when the physical ability of a first user is high enough to allow the first user to travel without any difficulty but the physical ability of a second user is low such that there would be a difficulty when the second user travels, the proposal execution unit 115 gives an "affectionate recommendation" to the second user. Here, in the "affectionate recommendation," when it is difficult for the user to travel to a facility that is set as a destination, the proposal execution unit 115 presents a traveling means that is suitable for the user. In the example illustrated in FIG. 15, the proposal execution unit 115 proposes a travel route which is highly convenient for a user having a low physical ability. In detail, the proposal execution unit 115 acquires a message from a user having a high physical ability with regard to a user having a low physical ability. Then, the proposal execution unit 115 provides the user having a low physical ability with a message prompting to take a trip including the message from the other user. Thus, a user who initially does not actively intend to take a trip because of the physical ability of the user becomes aware of the other user and is likely to accept the trip proposal. Thus, the recommendation degree of a trip proposal is higher in an "affectionate recommendation" than a "normal recommendation."

Figure 16:
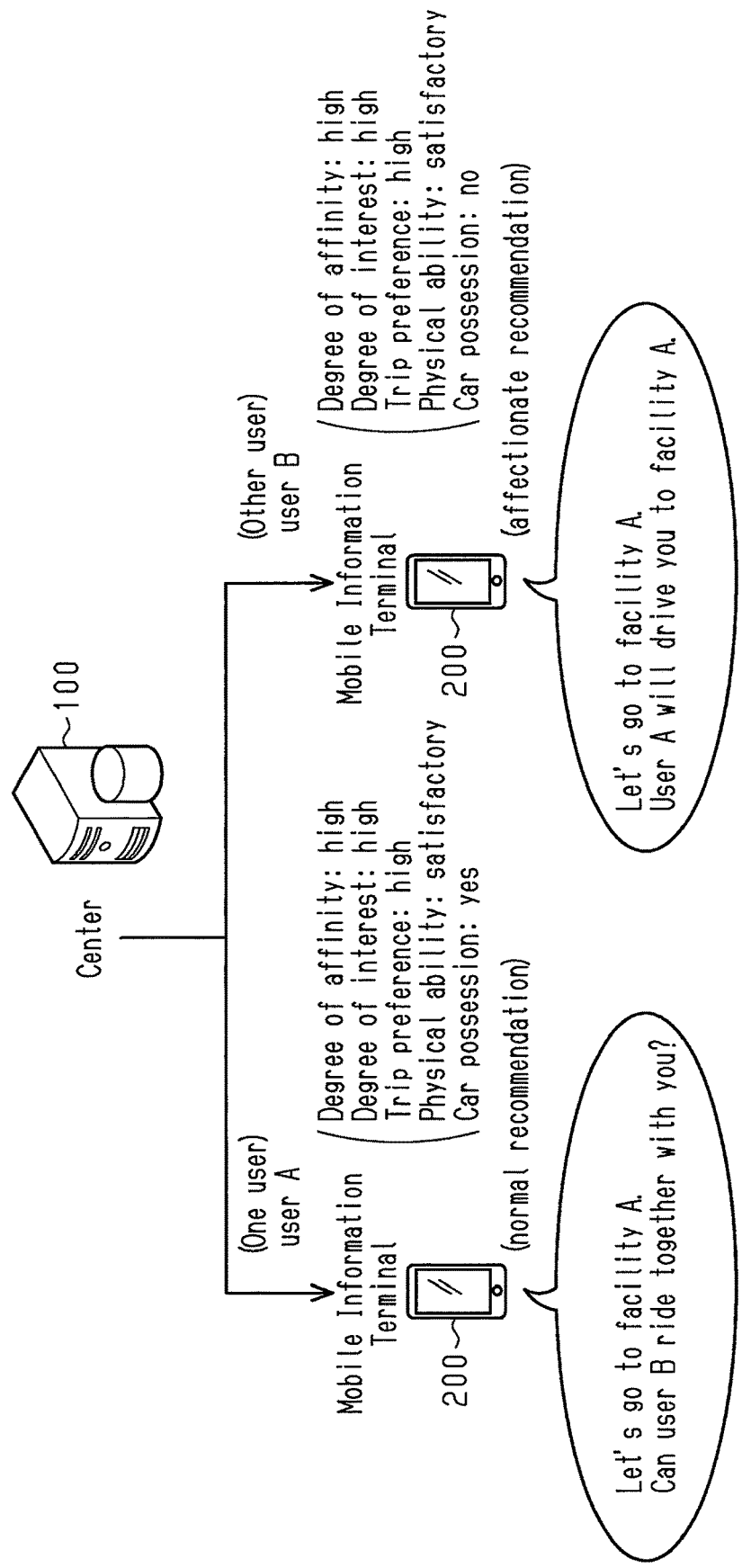
FIG. 16 is a diagram illustrating another example of a trip proposal provided by the information providing device of FIG. 15.

Further, as illustrated in FIG. 16, in the second embodiment, when the first user has a car but the second user does not, the proposal execution unit 115 gives the "affectionate recommendation" to the second user. In the example illustrated in FIG. 16, the second user that has no car corresponds to the user who has a difficulty in traveling to a facility set as the destination. Further, in this example, the proposal execution unit 115 provides the user with a message prompting to take a trip including a message from the outer user who has a car, for example, a message inviting the user having no car to ride the car together with the first user. Therefore, the user who initially does not actively intend to take a trip because the user has no car becomes aware of the other user and is likely to accept the trip proposal. Thus, the recommendation degree of a trip proposal is higher in an "affectionate recommendation" than a "normal recommendation."

In the examples illustrated in FIGS. 15 and 16, when the "affectionate recommendation" is given, it is necessary for the proposal execution unit 115 to first inquire the user who has no difficulty in traveling to the destination on whether or not there is a traveling means that would result in no difficulty when traveling to the destination. Therefore, when the "normal recommendation" is given to the first user and the "affectionate recommendation" is given to the second user, the proposal execution unit 115 sets the trip proposal order so that a higher priority is given to the first user than the second user. The proposal execution unit 115 first issues the "normal recommendation" including the inquiry as to whether or not there is a traveling means to the first user and then gives the "affectionate recommendation" including information related to the traveling means, which has been obtained through the inquiry, to the second user.

Depending on the degree of affinity between the first and second users, the degree of interest, and the trip preference, the proposal execution unit 115 may give a "high recommendation" to the first user and give an "affectionate recommendation" to the second user. In this case, when the "high recommendation" and the "affectionate recommendation" are both provided, higher priority is given to "high recommendation" in the order of proposal. Therefore, the proposal execution unit 115 first makes an inquiry to the second user on the recommendation information of the facility. Then, the proposal execution unit 115 gives the "high recommendation," which includes the recommendation information of the facility obtained through the inquiry, to the first user. In this case, an inquiry related to the traveling means is added to the "high recommendation."

Thereafter, the proposal execution unit 115 gives the "affectionate recommendation," which includes the information related to the traveling means obtained through the inquiry, to the second user. In the example described above, the "high recommendation" is given priority over "affectionate recommendation." Instead, "affectionate recommendation" may be given higher priority. In other words, a rule need not be set in the order for proposing a trip to each user as long as the trip proposal includes the information obtained through the inquiries made to the first and second users.

Figure 17:
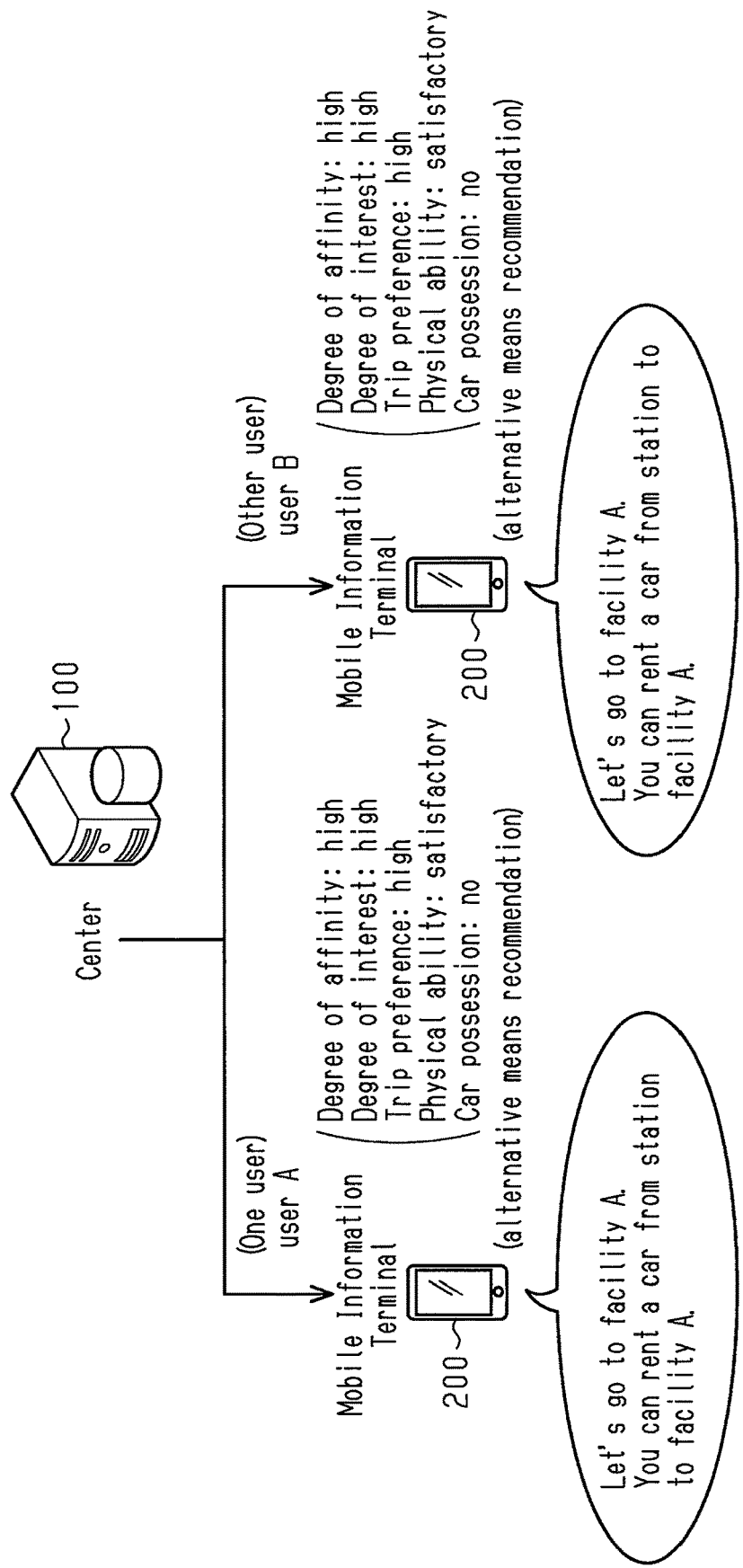
FIG. 17 is a diagram illustrating a further example of a trip proposal provided by the information providing device of FIG. 15.

As illustrated in FIG. 17, in the second embodiment, the proposal execution unit 115 gives an "alternative means recommendation" to the first and second users when the first and second users have no car. In the "alternative means recommendation," the proposal execution unit 115 presents a traveling means combining a train and a rental car as an alternative traveling means to the destination when the first and second users have no car. Therefore, the first and second users who initially do not consider taking the trip to the facility selected as the destination because they have no car become aware of the alternative traveling means and is more likely to accept the trip proposal. Thus, the recommendation degree of a trip proposal is higher in an "alternative means recommendation" than a "normal recommendation." When the "alternative means recommendation" is given like in the example illustrated in FIG. 17, the proposal execution unit 115 does not need to set a rule in the proposal order to each user since the users do not exchange messages. This differs from the case in which there is a "high recommendation" and an "affectionate recommendation."

FIG. 18 illustrates a list of corresponding relationships between the degree of affinity of the two users subject to the trip proposal, the degree of interest, the trip preference, the physical ability, the possession of a car, the trip proposal content, and the proposal order. As illustrated in FIG. 18, the proposal execution unit 115 gives an appropriate trip proposal to each user in accordance with the physical ability and the possession of a car of each user in addition to the degree of affinity, the degree of interest, and the trip preference of each users subject to the trip proposal and the relative relationship of the degree of interest between the users.

In addition to the advantages of the first embodiment, the second embodiment has the advantages described below.

(8) Even when a user subject to a trip proposal has a difficulty in moving to a facility set as a destination such as when the user has a difficulty in walking or the user has no car, such factors are copes with when the user is provided with the trip proposal. This allows a wide range of users in various environments to be prompted to take trips.

Third Embodiment

An information providing device according to a third embodiment will now be described with reference to the drawings. The third embodiment differs from the first embodiment in that the trip proposal content and proposal order are determined taking into account the relationship between the users in addition to the degree of affinity, the degree of interest, and the trip preference. The following description will focus on differences from the first embodiment.

Figure 19:
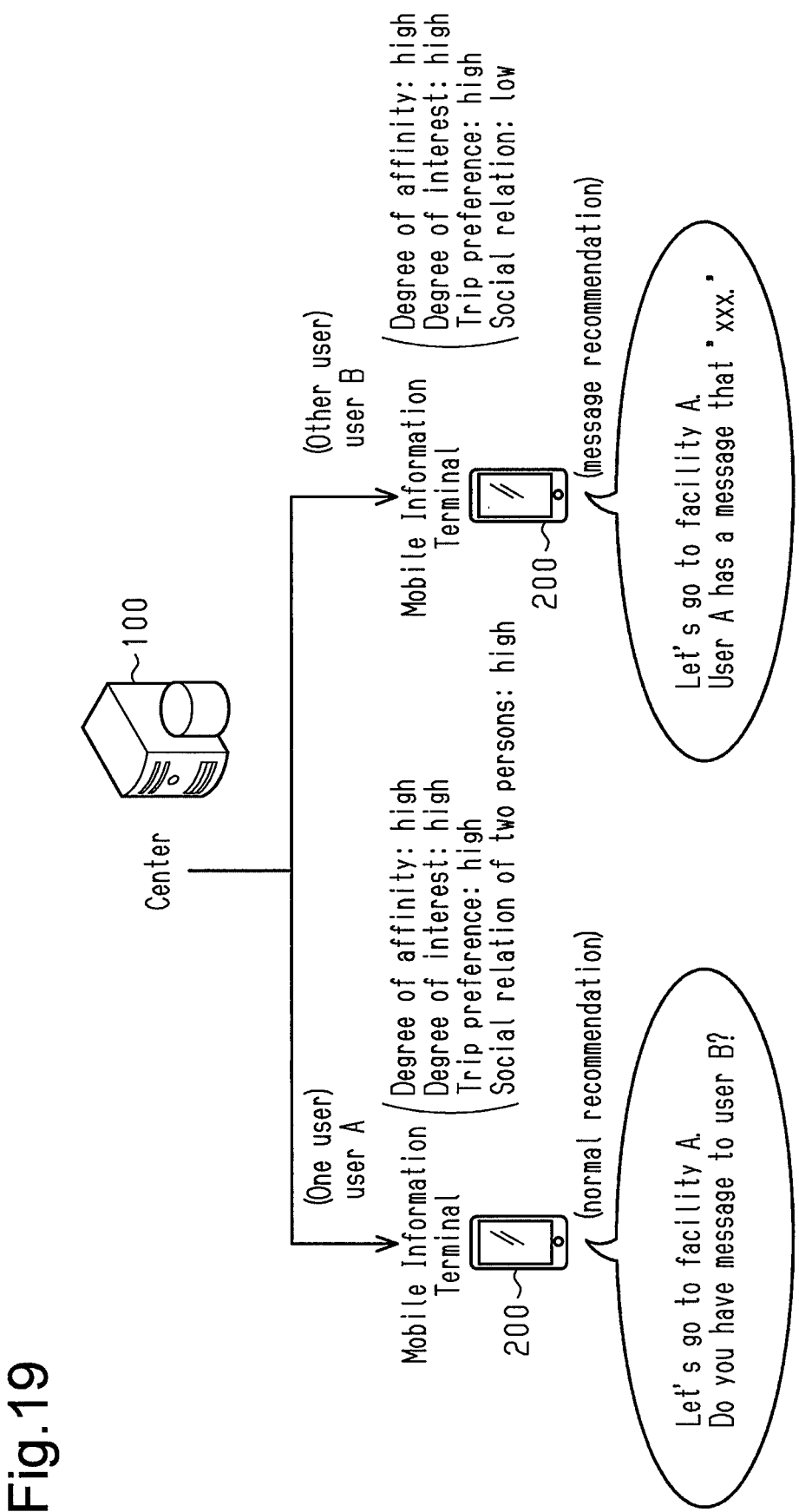
FIG. 19 is a diagram illustrating one example of a trip proposal provided by an information providing device according to a third embodiment.

As illustrated in FIG. 19, in the third embodiment, the proposal execution unit 115 acquires data related to a social relation between users such as a parent-child relationship from, for example, data registered to a phone book in the mobile information terminal 200 or data registered as SNS information to an external server 300. Further, when there is a hierarchical relationship between the users, and there is a difference in trip-related privileges, the proposal execution unit 115 gives a "message recommendation" to a user having a lower privilege. Here, in the "message recommendation," the proposal execution unit 115 adds a message from a user having a relatively high trip-related privilege. Thus, the user who initially cannot determine whether or not to take a trip is more likely to accept the trip proposal because of the advice from the user having a relatively strong position in the social relation. Thus, the degree of recommendation for a trip proposal content is higher in a "message recommendation" than a "normal recommendation."

The level of a trip-related privilege generally means that when the users have a parent-child relationship, the parent is considered to have a higher trip-related privilege than the child. Further, when the users are friends, the users have equal trip-related privileges. However, the level of trip-related privilege is not necessarily determined by only the social relation between the users. The level of trip-related privilege may be determined in view of various conditions such as age, sex, family structure, or the like of the user.

When a "message recommendation" is given like in the example illustrated in FIG. 19, it is necessary for the proposal execution unit 115 to make an inquiry for a message from the user having the relatively high trip-related privilege. When the "normal recommendation" is given to the first user like in the example illustrated in FIG. 19 and the "message recommendation" is given to the second user, the proposal execution unit 115 sets the trip proposal order so that higher priority is given to the first user than the second user. Therefore, the proposal execution unit 115 first issues the "normal recommendation" to the first user including an inquiry for a message and gives the "message recommendation" to the second user including information related to the message obtained through the inquiry.

Depending on the degree of affinity between the first and second users, the degree of interest, and the trip preference, the proposal execution unit 115 may give a "high recommendation" to the second user and give a "message recommendation" to the first user. In this case, "high recommendation" is given priority over "message recommendation" in the proposal order. Therefore, the proposal execution unit 115 first makes an inquiry to the first user for recommendation information on the facility and gives the "high recommendation" to the second user including the recommendation information of the facility obtained through the inquiry. The second user is also provided with an inquiry for a message used to generate a "message recommendation." Thereafter, the proposal execution unit 115 gives the "message recommendation" to the first user including the information related to the message obtained through the inquiry. In the example described above, "high recommendation" is given priority over "message recommendation" in the trip proposal order. Instead, "message recommendation" may be given higher priority. In other words, a rule need not be set in the order for proposing a trip to each user as long as the trip proposal includes the information obtained through the inquiries made to the first and second users.

FIG. 20 illustrates a list of corresponding relationships between the degree of affinity, the degree of interest, the trip preference, and the relationship of the two users subject to the trip proposal, the trip proposal content, and the proposal order. As illustrated in FIG. 20, the proposal execution unit 115 gives an appropriate trip proposal to each user in accordance with the relationship between the users in addition to the degree of affinity, the degree of interest, and the trip preference of the users subject to the trip proposal.

In addition to the advantages of the first and second embodiments, the third embodiment has the advantages described below.

(9) When the users subject to the trip proposal have a hierarchical relation with regard to trip-related privileges, a message from a user having a relatively high privilege is included in a trip proposal given to a user having a relatively low privilege. In this case, since the message from the user having a relatively high privilege is included in the trip proposal, the user having the relatively low privilege is more likely to accept the trip proposal. This prompts the user to take a trip in a further preferred manner.

Other Embodiments

It should be apparent to those skilled in the art that the present disclosure may be embodied in many other specific forms without departing from the spirit or scope of the invention. Particularly, it should be understood that the present disclosure may be embodied in the following forms.

In the above embodiments, the proposal execution unit 115 updates the parameters related to the degree of affinity, the degree of interest, and the trip preference of the users in accordance with whether or not the trip proposal is accepted by the users. Instead of or in addition to updating the parameters, the proposal execution unit 115 may update the parameters related to the degree of affinity, the degree of interest, and the trip preference of the users based on messages exchanged between the users through the mobile information terminal 200 when a trip is proposed. In this case, the proposal execution unit 115 does not need to update the parameters related to the degree of affinity, the degree of interest, and the trip preference together and may individually update the parameters in accordance with the content of the message.

In the above embodiments, when the parameters related to the degree of affinity, the degree of interest, and the trip preference of the users are updated in accordance with a response to a trip proposal from a user, the proposal execution unit 115 determines whether or not the trip proposal content has been changed based on the updated parameter. Further, the proposal execution unit 115 gives a trip proposal to the same user with the updated proposal content when the proposal content is determined to have been changed. Instead, when the trip proposal is not accepted by the user, the proposal execution unit 115 may change the user subject to the proposal without giving the trip proposal to the same user again.

In the above embodiments, the proposal execution unit 115 updates the parameters related to the degree of affinity, the degree of interest, and the trip preference of the users in accordance with a response to a trip proposal from a user. However, the parameters do not have to be updated in accordance with a response to a trip proposal from a user as long as information related to various parameters such as the trip movement history, SNS information, and watched television information of the user is periodically updated.

In the third embodiment, the proposal execution unit 115 adds a message from a user having a relatively high trip-related privilege when there is a hierarchical relationship between the users and a difference in the level of trip-related privilege. Instead, the proposal execution unit 115 may change the trip proposal order without changing the trip proposal content even when there is a difference in the level of trip-related privilege between the users. In this case, preferably, the proposal execution unit 115 first gives a trip proposal to the user having the relatively high trip-related privilege. When the trip proposal is accepted, the proposal execution unit 115 gives the trip proposal to the user having a relatively low privilege. This is because when a user having a relatively high trip-related privilege accepts the trip proposal, the trip would likely occur. Thus, a trip can be efficiently proposed by first providing a trip proposal to the user having the relatively high privilege.

In the third embodiment, the proposal execution unit 115 gives an appropriate trip proposal to each user in accordance with the relationship between the users in addition to the degree of affinity, the degree of interest, and the trip preference of the users subject to the trip proposal. Additionally, in the same manner as the second embodiment, the proposal execution unit 115 may provide each user that is subject to a trip proposal with an appropriate trip proposal that further takes into account the physical ability and the possession of a car.

In the second embodiment, the proposal execution unit 115 determines whether or not the user has a difficulty in traveling to a facility set as a destination in accordance with the physical ability or the possession of a car. However, the proposal execution unit 115 may use other elements such as the possession of other traveling means such as a motorcycle or the skill for driving a car when determining whether or not the user has a difficulty in traveling to the facility set as the destination.

In the second embodiment, among the first and second users subject to the trip proposal, when the first user has a difficulty in traveling to a facility set as a destination, the proposal execution unit 115 first inquires the second user whether or not a traveling means is available to the second user. Instead, the proposal execution unit 115 may first inquire a user of desires resulting from a difficulty to travel to the facility set as the destination and set the traveling means to the destination by taking into account the desire.

In the above embodiments, under the condition that the degree of affinity between the users subject to the trip proposal is high, the proposal execution unit 115 obtains information recommending a facility set as a destination from a user having a high degree of interest in the facility and provides another user with a trip proposal including the recommendation information. Instead, regardless of the degree of affinity between the users subject to the trip proposal, the proposal execution unit 115 may provide a trip proposal including the recommendation information of the facility obtained from a user having the high degree of interest in the facility.

In the above embodiments, when the users subject to the trip proposal include a user having a high degree of interest in the facility set as the destination and a user having a moderate or low degree of interest in the facility, the proposal execution unit 115 provides a trip proposal including information recommending the facility obtained from the user having a high degree of interest in the facility. When the first and second users subject to the trip proposal both have a high degree of interest in the facility set as the destination, the proposal execution unit 115 may provide each user with a trip proposal including recommendation information of the facility obtained from the other user.

In the above embodiments, when at least one of the degree of interest in the facility set as the destination and the trip preference is medium or low to at least one of the users subject to the trip proposal, the proposal execution unit 115 adds a facility that the user has a high degree of interest in and is located in the map data near the facility originally set as the destination to a trip proposal. Instead, under the condition that at least one of the degree of interest in the facility set as the destination and the trip preference is medium or low for both of the two users subject to the trip proposal, the proposal execution unit 115 may provide a trip proposal including the additional destination. In this case, the proposal execution unit 115 may add a facility in which both users have a high degree of interest as a destination or may add each facility in which each individual user has a high degree of interest.

In the above embodiments, the trip preference estimation unit 113 compares the level of burden when multiple users take a trip under the same situation to estimate the trip preference of the user. The trip preference estimation unit 113 may use other elements such as the frequency of trips taken by a user or data related to a personal characteristic input by the user as an element for determining the trip preference of the user.

The above embodiments have been described in connection with the example in which the number of users subject to the trip proposal is two. However, the number of users subject to the trip proposal is not necessarily two and may be three or greater. In this case, the proposal execution unit 115 may give the trip proposal based on the degree of affinity between the users subject to the trip proposal, the degree of interest, and the trip preference.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An information providing device for a trip to multiple users including a first user and a second user, the information providing device comprising circuitry configured to:
   determine a destination of the trip based on a degree of interest of the first user;
   provide the second user with a first trip proposal to the destination when a degree of interest of the second user in the destination is greater than or equal to a predetermined degree-of-interest threshold value; and
   provide the second user with a second trip proposal to the destination when the degree of interest of the second user in the destination is less than the predetermined degree-of-interest threshold value,
   wherein in the second trip proposal, a degree of recommendation of the trip proposal is increased from the first trip proposal.

2. The information providing device according to claim 1, wherein the circuitry provides the first trip proposal when trip preference of the second user is greater than or equal to a predetermined trip preference threshold value.

3. The information providing device according to claim 2, wherein the circuitry is configured to
   store data related to burden on each user when taking a trip in a storage unit in association with each situation of the user,
   read from the storage unit and compare the burden of the users when taking a trip under the same situation, and estimate the trip preference based on the comparison so that the trip preference of a user having a relatively large burden is relatively small.

4. The information providing device according to claim 1, wherein when providing the second trip proposal, the circuitry is configured to add a destination that is a location in which a user provided with the second trip proposal has a relatively high degree of interest and the location is within a predetermined range from a location originally set as the destination.

5. The information providing device according to claim 1, wherein the circuitry is configured to provide the second user with the second trip proposal including information, which recommends a location set as the destination, obtained from the first user when the degree of interest of the second user in the set location is less than the predetermined degree-of-interest threshold value.

6. The information providing device according to claim 5, wherein the circuitry is configured to provide the second trip proposal including the recommendation information for the location obtained from the first user under a condition that a degree of affinity between the multiple users is greater than or equal to a predetermined degree-of-affinity threshold value.

7. The information providing device according to claim 1, wherein when at least one of the multiple users has a difficulty in traveling to a location that is set as the destination, the circuitry is configured to present a traveling means that copes with the difficulty of the user when providing the trip proposal.

8. The information providing device according to claim 1, wherein the circuitry is configured to
acquire data related to a social relation between the multiple users,
compare trip-related privileges of the multiple users based on the acquired data related to the social relation, and
provide a user having a relatively low trip-related privilege with a trip proposal including a message from a user having a relatively high trip-related privilege.

9. The information providing device according to claim 2, wherein the circuitry is configured to acquire a response from at least one of the multiple users to the trip proposal and update at least one of a degree of affinity between the multiple users, the degree of interest in a location set as the destination, and the trip preference based on the acquired responses.

10. The information providing device according to claim 9, wherein
when the trip proposal is not accepted by at least one of the multiple users, the circuitry is configured to determine whether or not to change the trip proposal content based on the updated data of the degree of affinity, the degree of interest in the location set as the destination, and the trip preference, and
the circuitry is configured to provide the at least one of the multiple users that did not accept the trip proposal with a changed proposal content when determining that the proposal content has been changed.

11. An information providing method for a trip to multiple users including a first user and a second user, the method comprising:
determining a destination of the trip based on a degree of interest of the first user with circuitry;
providing the second user with a first trip proposal to the destination when a degree of interest of the second user in the destination is greater than or equal to a predetermined degree-of-interest threshold value with circuitry; and
providing the second user with a second trip proposal to the destination when the degree of interest of the second user in the destination is less than the predetermined degree-of-interest threshold value with circuitry,
wherein in the second trip proposal, a degree of recommendation of the trip proposal is increased from the first trip proposal.

12. The information providing method according to claim 11, wherein the method further comprising providing the first trip proposal when trip preference of the second user is greater than or equal to a predetermined trip preference threshold value.

13. The information providing method according to claim 12, wherein the method further comprising:
storing data related to burden on each user when taking a trip in a storage unit in association with each situation of the user with circuitry,
reading from the storage unit and compare the burden of the users when taking a trip under the same situation with circuitry, and
estimating the trip preference based on the comparison so that the trip preference of a user having a relatively large burden is relatively small with circuitry.

14. The information providing method according to claim 11, wherein the method further comprising, when providing the second trip proposal, adding a destination that is a location in which a user provided with the second trip proposal has a relatively high degree of interest and the location is within a predetermined range from a location originally set as the destination with circuitry.

15. The information providing method according to claim 11, wherein the method further comprising, when at least one of the multiple users has a difficulty in traveling to a location that is set as the destination, presenting a traveling means that copes with the difficulty of the user when providing the trip proposal with circuitry.

16. A non-transitory computer readable medium that stores a program for a trip to multiple users including a first user and a second user, wherein the program instructs an information providing device to:
determine a destination of the trip based on a degree of interest of the first user with circuitry;
provide the second user with a first trip proposal to the destination when a degree of interest of the second user in the destination is greater than or equal to a predetermined degree-of-interest threshold value with circuitry; and
provide the second user with a second trip proposal to the destination when the degree of interest of the second user in the destination is less than the predetermined degree-of-interest threshold value with circuitry,
wherein in the second trip proposal, a degree of recommendation of the trip proposal is increased from the first trip proposal.

17. The non-transitory computer readable medium according to claim 16, wherein the program instructs the information providing device to provide the first trip proposal when trip preference of the second user is greater than or equal to a predetermined trip preference threshold value with circuitry.

18. The non-transitory computer readable medium according to claim 17, wherein the program instructs the information providing device to store data related to burden on each user when taking a trip in a storage unit in association with each situation of the user with circuitry, read from the storage unit and compare the burden of the users when taking a trip under the same situation with circuitry, and estimate the trip preference based on the comparison so that the trip preference of a user having a relatively large burden is relatively small with circuitry.

19. The non-transitory computer readable medium according to claim 16, wherein when providing the second trip proposal, the program instructs the information providing device to add a destination that is a location in which a user provided with the second trip proposal has a relatively high degree of interest and the location is within a predetermined range from a location originally set as the destination with circuitry.

20. The non-transitory computer readable medium according to claim 16, wherein when at least one of the multiple users has a difficulty in traveling to a location that is set as the destination, the program instructs the information providing device to present a traveling means that copes with the difficulty of the user when providing the trip proposal with circuitry.

* * * * *